(12) United States Patent
Kawasaki et al.

(10) Patent No.: US 7,438,047 B2
(45) Date of Patent: Oct. 21, 2008

(54) MULTI-CYLINDER ENGINE

(75) Inventors: Takeshi Kawasaki, Osaka (JP); Yutaka Teruumi, Osaka (JP); Koji Fujimura, Osaka (JP); Hiroshi Inoue, Osaka (JP); Tetsushi Karasawa, Osaka (JP); Seiji Izuhara, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/854,568

(22) Filed: Sep. 13, 2007

(65) Prior Publication Data

US 2008/0221775 A1    Sep. 11, 2008

(30) Foreign Application Priority Data

Mar. 9, 2007  (JP) .............................. 2007-059965

(51) Int. Cl.
    *F02D 9/10* (2006.01)
(52) U.S. Cl. .................... 123/337; 123/470; 123/472
(58) Field of Classification Search ................ 123/337, 123/470, 472
    See application file for complete search history.

(56) References Cited

U.S. PATENT DOCUMENTS 6,494,186 B1*  12/2002  Wakeman ................ 123/479
6,866,027 B1*  3/2005  Marchesini et al. ......... 123/480
7,044,106 B2*  5/2006  Kojima et al. .............. 123/337
7,134,425 B2*  11/2006  Taguchi et al. ............. 123/470
7,357,118 B2*  4/2008  Fujii et al. .................. 123/337
2005/0056261 A1*  3/2005  Marchesini et al. ......... 123/480

FOREIGN PATENT DOCUMENTS

| JP | 10-220295 A | 8/1998 |
| JP | 2005-273605 A | 10/2005 |
| JP | 2005-273606 A | 10/2005 |
| JP | 2005-273607 A | 10/2005 |
| JP | 2006-194208 A | 7/2006 |
| JP | 2006-226281 A | 8/2006 |

* cited by examiner

*Primary Examiner*—Erick Solis
(74) *Attorney, Agent, or Firm*—Panitch Schwarze Belisario & Nadel LLP

(57) ABSTRACT

The present invention concerns a multi-cylinder engine comprising a throttle body (5) in which a throttle intake-air passage (6) is provided. A throttle valve (7) is arranged in this throttle intake-air passage (6). Attached to the throttle body (5) is an injector (8), a leading end portion (9) of which is arranged opposite to an interior area of the throttle intake-air passage (6) downstream of the throttle valve (7) and is opened to provided a liquid-fuel injection hole (10). An intake-air pressure sensor (15) is attached to the throttle body (5) together with the injector (8) and an intake-air pressure introduction passage (18) has an inlet (18a) provided by opening an inner peripheral surface of the throttle intake-air passage (6) upstream of the injector (8).

26 Claims, 10 Drawing Sheets

MULTI-CYLINDER ENGINE

TECHNICAL FIELD

The present invention relates to a multi-cylinder engine and more particularly a multi-cylinder engine capable of more uniformly distributing fuel-air mixture to every cylinder.

BACKGROUND OF THE INVENTION

Background Art

A conventional example of these multi-cylinder engines comprises a cylinder head to which an intake-air distribution passage is attached, this intake-air distribution passage distributing fuel-air mixture to a plurality of cylinders and having a single distribution passage inlet to which a throttle body is attached, liquid fuel being supplied to the throttle body, as well as the present invention (for example, see Japanese Patent Application Laid-Open No. 10-220295, FIGS. 1 and 2).

The multi-cylinder engine of this type employs a carburetor for supplying liquid fuel to the throttle body and therefore causes problems.

However, the above-mentioned conventional technique has the following problems.

<Problem> There is a likelihood that the fuel-air mixture is not uniformly distributed to every cylinder.

A carburetor is used for feeding liquid fuel to the throttle body, which causes the liquid fuel to be insufficiently atomized with the result of being easily apt to invite an uneven concentration distribution of the fuel-air mixture in the intake distribution passage and entailing a likelihood that the fuel-air mixture is distributed to every cylinder disuniformly.

The present invention has an object to provide a multi-cylinder engine capable of solving the above-mentioned problems and more specifically a multi-cylinder engine able to distribute the fuel-air mixture to every cylinder more uniformly.

The inventive featuring matter of the invention as set forth in claim 1 is as follows.

As exemplified in FIG. 6, a multi-cylinder engine comprises a cylinder head 1 to which an intake-air distribution passage 2 is attached, the intake-air distribution passage 2 distributing a fuel-air mixture to a plurality of cylinders 3 and having a single distribution passage inlet 4 to which a throttle body 5 is attached as shown in FIG. 1(A), liquid fuel being fed to this throttle body 5.

In this multi-cylinder engine, as shown in FIGS. 1(A) and 1(B), the throttle body 5 has an interior area provided with a throttle intake-air passage 6, in which a throttle valve 7 is arranged. Attached to the throttle body 5 is an injector 8 a leading end 9 of which is disposed opposite to an interior area of the throttle intake-air passage 6 downstream of the throttle valve 7 and is opened to provide a hole 10 for injecting the liquid fuel.

As exemplified in FIG. 1(A), an intake-air pressure sensor 15 which detects an intake-air pressure of the throttle intake-air passage 6 and an engine rotation-number sensor 16 for detecting number of rotations of an engine are associated with the injector 8 through a control means 17, which controls an amount of the liquid fuel injected from the injector 8, based on the intake-air pressure and the number of rotations of the engine.

The intake-air pressure sensor 15 is attached to the throttle body 5 together with the injector 8.

The throttle intake-air passage 6 of the throttle body 5 has a peripheral wall in which there is provided an intake-air pressure introduction passage 18 for introducing the intake-air pressure within the throttle intake-air passage 6 to the intake-air pressure sensor 15.

The throttle intake-air passage 6 has an inner peripheral surface opened to provide an inlet 18a of the intake-air pressure introduction passage 18 upstream of the injector 8.

EFFECT OF THE INVENTION (Invention of Claim 1)

<Effect> It is possible to more uniformly distribute the fuel-air mixture to every cylinder.

As exemplified in FIGS. 1(A) and 1(B) the injection 8 has the leading end 9 arranged opposite to an interior area of the throttle intake-air passage 6 downstream of the throttle valve 7 and opened to provide the hole 10 for injecting the liquid fuel. Therefore, fine oil drops of the liquid fuel injected through the liquid-fuel injection hole 10 are involved in a rear flow (turbulent flow) arising downstream of the throttle valve 7 to result in accelerating the atomization of the liquid fuel, thereby enabling the fuel-air mixture to become more uniform in concentration distribution within the intake-air distribution passage 2 so as to distribute the mixture to every cylinder 3 more evenly.

<Effect> It has a high function of being able to more uniformly distribute the fuel-air mixture to every cylinder.

As illustrated in FIG. 1(A), the throttle intake-air passage 6 has the inner peripheral surface opened to provide the inlet 18a of the intake-air pressure introduction passage 18 upstream of the injector 8. Thus the liquid fuel injected through the liquid-fuel injection hole 10 of the injector 8 is taken away from the inlet 18a of the intake-air pressure introduction passage 18 by the flow of the intake air and therefore can hardly enter the intake-air introduction passage 18. This stabilizes the intake-air pressure detection by the intake-air pressure sensor 15 with the result of inhibiting the disadvantage that the amount of the fuel injected by the injector 8 unnecessarily varies so as to offer a high function of being able to more uniformly distribute the fuel-air mixture to every cylinder.

<Effect> A fuel supply device can be made compact.

As exemplified in FIG. 1(A), since the intake-air pressure sensor 15 is attached to the throttle body 5 together with the injector 8, the parts relating to the fuel supply are collected to the throttle body with the result of making the fuel supply device compact.

(Invention of Claim 2)

It offers the following effect in addition to the effect presented by the invention of claim 1.

<Effect> It has a high function of being able to more uniformly distribute the fuel-air mixture to every cylinder.

The intake-air pressure introduction passage 18 is oriented so that it makes an angle of at least 45 degrees with respect to a transverse extending line 19a as shown in FIG. 9. Accordingly, the intake-air pressure introduction passage 18 is directed so as to approach a tangent direction of the throttle intake-air passage 6 more than a radial direction thereof. So even if the intake-air pressure introduction passage 18 has a smaller sectional area, the inlet 18a of the intake-air pressure introduction passage 18 can have a larger sectional area. This allows the intake-air pressure introduction passage 18 to have a smaller sectional area so as not to be influenced by the pulsation of the intake-air pressure and at the same time enables the inlet 18a of the intake-air pressure introduction passage 18 to have a larger sectional area so as to prevent the clogging of the inlet 18a with the liquid fuel. Thus the intake-air pressure sensor 15 can detect the intake-air pressure stably and there is not caused the disadvantage that the amount of the fuel injected from the injector 8 unnecessarily varies, which entails a high function of being able to more uniformly distribute the fuel-air mixture to every cylinder 3.

<Effect> It is easy to form the intake-air pressure introduction passage by drilling.

The intake-air pressure introduction passage 18 is oriented so that it makes an angle of not more than 75 degrees with respect to the transverse extending line 19a as illustrated in FIG. 9. This inhibits the disadvantage that the intake-air pressure introduction passage 18 comes too close to the tangent direction of the inner peripheral surface of the throttle intake-air passage 6, so as to easily form the intake-air pressure introduction passage 18 by drilling.

(Invention of Claim 3)

It offers the following effect in addition to the effect of the invention as set forth in claim 2.

<Effect> It is easy to form the intake-air introduction passage by drilling.

As exemplified in FIG. 9, the intake-air pressure introduction passage 18 is oriented so that it makes an angle (18α) of at least 45 degrees with respect to the transverse extending line 19a on the projected drawing whose surface is perpendicular to a center axis 6a of the throttle intake passage 6. This prevents the disadvantage that the intake-air pressure introduction passage 18 is directed to come too close to an axial direction of the throttle intake-air passage 6 so as to elongate the intake-air pressure introduction passage 18 unnecessarily, with the result of easily forming the intake-air pressure introduction passage 18 by drilling. Further, as exemplified in FIG. 9, the intake-air pressure introduction passage 18 is oriented so that it makes an angle (18α) of not more than 75 degrees with respect to the transverse extending line 19a on the projected drawing whose surface where it is perpendicular to the center axis 6a of the throttle intake passage 6. This prevents the disadvantage that the intake-air pressure introduction passage 18 is directed to come too close to the tangent direction of the inner peripheral surface of the throttle intake-air passage 6, with the result of easily forming the intake-air pressure introduction passage 18 by drilling.

(Invention of Claim 4)

It offers the following effect in addition to the effect presented by the invention of claim 2.

<Effect> It has a high function of being able to more uniformly distribute the fuel-air mixture to every cylinder.

As exemplified in FIG. 10(B), a butterfly valve is used for the throttle valve 7 and the inlet 18a of the intake-air pressure introduction passage 18 is arranged so that it overlaps the center axis 6a of the throttle intake-air passage 6 on the projected drawing whose surface is in parallel to the center axis 6a of the throttle intake-air passage 6 and to an axis of the throttle valve 7. This allows a high-speed intake air passing by the throttle valve 6 to pass by the inlet 18a of the intake-air pressure introduction passage 18 and as a result the liquid fuel clogged at the inlet 18a of the intake-air pressure introduction passage 18 is sucked toward the throttle intake-air passage 18 by a negative pressure of the intake air so that the liquid fuel hardly clogs the passage inlet 18a of the intake-air pressure introduction passage 18.

Besides, the intake-air pressure introduction passage 18 is downwardly inclined from its outlet 18b to its inlet 18a and, on the above-mentioned projected drawing, is oriented so that it makes an angle (18α) of at least 45 degrees but not more than 75 degrees with respect to an extending axial line 6c of the throttle intake-air passage 6. Thus when compared with the case where the aforesaid angle (18β) is below 45 degrees, the liquid fuel that has entered the intake-air pressure introduction passage 18 is apt to easily flow out by its own weight. Further, when compared with the case where the foregoing angle (18β) exceeds 75 degrees, the inlet 18a of the intake-air pressure introduction passage 18 can have a sectional area of its opening larger than that of the intake-air pressure introduction passage 18 in proportion to the elongation of the throttle intake-air passage 6, while the intake-air pressure introduction passage 18 can have a smaller sectional area so that it is hardly influenced by the pulsation of the intake-air pressure. Simultaneously, the intake-air pressure introduction passage 18 has its inlet 18a made larger in its sectional area so as to be able to prevent the liquid fuel from clogging the passage inlet 18a.

For the foregoing reasons, the present invention stabilizes the detection of the intake-air pressure by the intake-air pressure sensor 15, inhibits the disadvantage of unnecessarily varying the amount of the fuel injected from the injector 8 and provides a high function of being able to more uniformly distribute the fuel-air mixture to every cylinder.

(Invention of Claim 5).

It offers the following effect in addition to the effect presented by the invention of claim 1.

<Effect> It has a high function of being able to more uniformly distribute the fuel-air mixture to every cylinder.

As shown in FIG. 10(A), an attaching hole 20 is formed so as to face downwardly and the intake-air pressure sensor 15 is attached to the attaching hole 20. Provided below the attaching hole 20 is a liquid fuel reservoir 21, at an upper portion of which the intake-air pressure introduction passage 18 is opened to provide the outlet 18b. Therefore, the liquid fuel that entered the intake-air pressure introduction passage 18 can flow out of the inlet 18a of the intake-air pressure introduction passage 18 into the throttle intake-air passage 6 and besides can flow out of the outlet 18b of the intake-air pressure introduction passage 18 into the liquid fuel reservoir 21, so that the liquid fuel hardly clogs the intake-air pressure introduction passage 18. Additionally, the liquid fuel and dust that have entered the intake-air pressure introduction passage 18 stay in the liquid fuel reservoir 21 so as not to contact the intake-air pressure sensor 15. Thus it is possible to prevent the intake-air pressure sensor 15 from becoming disorder and reducing its sensitivity. Owing to this fact, this invention stabilizes the detection of the intake-air pressure by the intake-air pressure sensor 15, inhibits the disadvantage of unnecessarily varying the amount of the fuel injected from the injector 8 and provides a high function of being able to more uniformly distribute the fuel-air mixture to every cylinder.

(Invention of Claim 6)

It offers the following effect in addition to the effect presented by the invention of claim 1.

<Effect> The fuel supply device can be made compact.

As illustrated in FIG. 8(A), the injector 8 is arranged behind a throttle input arm 22 and a boss 20a of the attaching hole 22 for the intake-air pressure sensor 15 is positioned laterally of the throttle input arm 22. Therefore, the rear and front spaces of the throttle input arm 22 can be effectively used for arranging the injector 8 and the boss 20a, respectively so as to collect the parts relating to the fuel supply into the throttle body 5 with the result of making the fuel supply device compact.

(Invention of Claim 7)

It offers the following effect in addition to the effect presented by the invention of claim 6.

<Effect> It is possible to reduce the number of parts.

As exemplified in FIG. 8(A), the boss 20a of the attaching hole 20 for the intake-air pressure sensor 15 also serves as a stopper for pivoting the throttle input arm 22. Accordingly, there is no need of providing a stopper for the pivotal movement, to be exclusively used for the throttle input arm 22 separately. This can reduce the number of parts.

(Invention of Claim 8)

It offers the following effect in addition to the effect presented by the invention of claim 1.

<Effect> It is possible to inhibit the delay of the fuel supply in proportion to the increase of load.

As exemplified in FIG. 2(A), an adjacent inner peripheral surface 6e is so formed that a passage defined by the inner peripheral surface 6e has a sectional area progressively increasing as it is going away from an end edge 6f of an inner peripheral surface 6d around the valve 6. When the engine is in operation at a low speed with a light load, the throttle valve 7 has a pivotal end 7a arranged at a portion 7c close to a position where the throttle valve 7 is fully closed so that its pivotal end 7a can be pivoted within the adjacent inner peripheral surface. Therefore, even if the engine is in operation at the low speed with the light load when the throttle valve 7 opens at a slow speed, the amount of the intake air promptly increases by the increase of the load only because the throttle valve 7 slightly opens. In consequence, it is possible to inhibit the delay of the fuel supply in proportion to the increase of the load.

(Invention of Claim 9)

It offers the following effect in addition to the effect presented by the invention of claim 8.

<Effect> An intake-air resistance of the throttle intake-air passage is decreased.

As shown in FIG. 2(A), the adjacent inner peripheral surface 6e is tapered as a truncated cone having a passage a sectional area of which is progressively increasing from the upstream end edge 6f of the valve-surrounding inner peripheral surface 6d toward an upstream side. Therefore, the intake-air resistance of the throttle intake-air passage 6 is reduced.

(Invention of Claim 10)

It offers the following effect in addition to the effect presented by the invention of claim 1.

<Effect> It is possible to make a minute control of the fuel supply in proportion to the load.

As exemplified in FIGS. 2(A) and 2(B), an annular inner peripheral surface of a predetermined width of a predetermined intake-air passage 6 is made as a venturi portion 6i, which is opened to provide the inlet 18a of the intake-air pressure introduction passage 18. Thus when compared with the case where an annular inner peripheral surface of a constant inner diameter is opened to provide the inlet 18a of the intake-air pressure introduction passage 18, it is possible to precisely detect the variation of the degree of opening of the throttle valve 7 based on the intake-air pressure with the result of being able to perform a minute control of the fuel supply in proportion to the load for the following reason.

In the case where the venturi portion 6i is opened to provide the inlet 18a of the intake-air pressure introduction passage 18, the intake-air pressure is considerably decreased when it is detected with the throttle valve 7 at the full-closed position 7b but it does not change so much when it is detected with the throttle valve at the full-open position 7d, in comparison with the case where the annular inner peripheral surface of the constant diameter is opened. Thus if the venturi portion 6i is opened to provide the inlet 18a of the intake-air pressure introduction passage 18, the intake-air pressure largely differs between the full-open position 7d of the throttle valve 7 and the full-closed position 7b thereof when compared with the case where the annular inner peripheral surface of the constant diameter is opened to result in increasing a detection range of the intake-air pressure. Accordingly, it is possible to correctly detect the variation of the degree of opening of the throttle valve 7 based on the intake-air pressure.

(Invention of Claim 11)

<Effect> The intake-air pressure can be detected precisely.

As shown in FIG. 2(A), while the throttle valve 7 is opening, the inlet 18a of the intake-air pressure introduction passage 18 is arranged on a lateral inner peripheral surface 6j opposite to a lateral inner peripheral surface of the throttle intake-air passage 6 toward which the downstream-oriented half portion 7e moves. Thus the intake-air pressure is detected without being disturbed by an intake-air flow guided through a downstream oriented half portion 7a and therefore the intake-air pressure can be detected correctly.

(Invention of Claim 12)

It offers the following effect in addition to the effect presented by the invention of claim 1.

<Effect> It is possible to distribute the amount of intake air to a plurality of cylinders evenly.

As exemplified in FIG. 3, a breather outlet 51 is arranged opposite to an interior area of a region extending from the throttle intake-air passage 6 to a distribution passage inlet portion 4 of the intake-air distribution passage 2, so that the air and blow-by gas within the crank case to be sucked out of the breather outlet 51 are flowed into the intake-air distribution passage 2 while being mixed with the intake air in the above region and are uniformly distributed to the cylinders 3. Thus the amount of the intake air can be distributed to the cylinders 3 evenly.

(Invention of Claim 13)

It offers the following effect in addition to that presented by the invention of claim 12.

<Effect> It is possible to distribute the amount of intake air to a plurality of cylinders evenly.

As shown in FIG. 2(A), when seen in a direction parallel to an axis 12 of the throttle valve 7, the breather outlet 51 is arranged just behind the valve axis 12. Therefore, the air and blow-by gas within the crank case to be sucked out of the breather outlet 51 are involved in the intake air by a turbulent flow arising just behind the valve axis 12 to be dispersed into the intake air uniformly and introduced into the intake-air distribution passage 2. Thus the amount of the intake-air can be distributed to the cylinders 3 uniformly.

(Invention of Claim 14)

It offers the following effect in addition to that presented by the invention of claim 1.

<Effect> It is possible to enhance the exhaust-gas property as well as the quietude of the operation.

An ignition timing is made earlier for the cylinder 3 of a lower compression ratio to result in hardly causing incomplete combustion and reducing the poisonous components in the exhaust gas. On the other hand, the ignition timing is more delayed for the cylinder 3 of a higher compression ratio with the result of inhibiting the knocking and alleviating the combustion noise. This enhances the exhaust-gas property and the quietude of operation.

(Invention of Claim 15)

It offers the following effect in addition to that presented by the invention of claim 14.

<Effect> It is possible to perform a minute control of ignition timing for every cylinder.

Based on a mutually different ignition timing control map for every cylinder 3, the ignition timing control is performed by a control means 17 for every cylinder 3. Accordingly, it is possible to perform a minute control of the ignition timing for every cylinder 3.

(Invention of Claim 16)

It offers the following effect in addition to that presented by the invention of claim 1.

<Effect> It is possible to uniformize the fuel-air ratio of the air mixture distributed to every cylinder.

With the same amount of fuel supply, since more amount of the fuel is supplied to the cylinder 3 where the fuel-air mixture has a lower fuel concentration, it is possible to uniformize the fuel-air ratio of the air mixture to be distributed to every cylinder 3.

(Invention of Claim 17)

It offers the following effect in addition to that presented by the invention of claim 16.

<Effect> It is possible to perform a minute control of the fuel supply to every cylinder.

Based on a mutually different fuel supply control map for every cylinder 3, the fuel supply control is performed by the control means 17 for every cylinder 3. Accordingly, it is possible to perform a minute control of the fuel supply for every cylinder 3.

(Invention of Claim 18)

It offers the following effect in addition to that presented by the invention of claim 1.

<Effect> It is possible to uniformize the fuel-air ratio of the air mixture to be distributed to every cylinder.

With the same start-timing of the fuel supply, the fuel-supply start-timing is made earlier to the cylinder 3 where the mixture has a lower fuel concentration. This prevents the disadvantage that the fuel to be supplied to the cylinder where the fuel concentration is easily apt to become lower is residual at the intake-air distribution passage 2 and as a result is supplied to another cylinder 3. This can uniformize the air-fuel ratio of the mixture to be distributed to every cylinder 3.

(Invention of Claim 19)

It offers the following effect in addition to that presented by the invention of claim 18.

<Effect> It is possible to perform a minute control of the fuel supply for every cylinder.

Based on the mutually different fuel supply control map for every cylinder, the fuel supply control is performed by the control means 17 for every cylinder 3. Accordingly, it is possible to perform a minute control of the fuel supply for every cylinder 3.

(Invention of Claim 20)

It offers the following effect in addition to that presented by the invention of claim 1.

<Effect> it is possible to uniformize the distribution amount of the intake air to every cylinder.

As exemplified in FIG. 3, a straight continuous intake-air distribution passage 2 is formed in a longitudinal direction within a box-shaped intake-air passage wall 2a and intake-air port inlets 3a of the respective cylinders 3 are arranged opposite to an interior area of the intake-air distribution passage 2 while retaining a predetermined spacing from each other in the longitudinal direction. Consequently, the intake-air hardly stays within the intake-air distribution passage 2 with the result of being able to uniformize the distribution amount of the intake air to every cylinder 3.

It offers the following effect in addition to that presented by the invention of claim 1.

(Invention of Claim 21)

<Effect> It is possible to prevent the operation failure of the throttle valve.

As exemplified in FIG. 1(A), an upstream side of the throttle valve 7 is opened to provide an upstream breather outlet 52. In order to communicate the upstream breather outlet 2 with a breather chamber 56 through an upstream breather passage 52a, a downstream side of the throttle valve 7 is opened to provide a downstream breather outlet 53, which is communicated with the breather chamber 56 through a downstream breather passage 53a. In consequence, the blow-by gas is sucked into the upstream side of the throttle valve 7 in a reduced amount. This inhibits the disadvantage that the engine oil contained in the blow-by gas as well as carbide adheres to the throttle valve 7 and besides can prevent the operation failure of the throttle valve 7 attributable to that disadvantage.

(Invention of Claim 22)

It offers the following effect in addition to that presented by the invention of claim 21.

<Effect> It is possible to prevent the operation failure of the throttle valve.

As exemplified in FIGS. 4(A) and 4(B), conducted out of the breather chamber 56 is a common breather passage 54, from which the upstream breather passage 52a and the downstream breather passage 53a are branched off. Thus the engine oil flowed into the upstream breather passage 52a can be sucked out into the downstream breather passage 53a owing to a pressure difference between the upstream side of the throttle valve 7 and the downstream side thereof. This inhibits the disadvantage that the engine oil contained in the blow-by gas as well as carbide adheres to the throttle valve 7 and besides can prevent the operation failure of the throttle valve 7 attributable to that disadvantage.

(Invention of Claim 23)

It offers the following effect in addition to that presented by the invention of claim 22.

<Effect> It is possible to prevent the operation failure of the throttle valve.

As shown in FIG. 5(A), the upstream breather passage 52a projecting from an end conducted out of the common breather passage 54 has a starting end portion 52b oriented upwards. This allows the engine oil flowed into the upstream breather passage 52a to be readily sucked into the downstream breather passage 53a. This inhibits the disadvantage that the engine oil contained in the blow-by gas as well as carbide adheres to the throttle valve 7 and besides can prevent the operation failure of the throttle valve 7 attributable to that disadvantage.

(Invention of Claim 24)

It offers the following effect in addition to that presented by the invention of claim 22.

<Effect> It is possible to prevent the operation failure of the throttle valve.

As shown in FIG. 5(B), the downstream breather passage 53a is oriented downwardly from the common breather passage 54 toward the downstream breather outlet 53. Therefore, the engine oil flowed into the downstream breather passage 53a promptly flows out of the downstream breather outlet 53 and as a result the engine oil within the upstream breather passage 52a is easily apt to be sucked into the downstream breather passage 53a. This inhibits the disadvantage that the engine oil contained in the blow-by gas as well as carbide adheres to the throttle valve 7 and besides can prevent the operation failure of the throttle valve 7 attributable to that disadvantage.

(Invention of Claim 25)

It offers the following effect in addition to that presented by the invention of claim 21.

<Effect> It is possible to inhibit an excessive amount of engine oil from being sucked out of the breather chamber.

As exemplified in FIG. 1(A), the downstream breather passage 53a is made smaller than the upstream breather passage 52a in sectional area to result in augmenting the resistance of the downstream passage 53a. This can prevent an excessive amount of engine oil from being sucked out of the breather chamber 56 even if the throttle valve 7 takes a full-closed position 7b or a slightly-open position 7c (which is close to the full-closed position 7b) as shown in FIG. 2(A), thereby considerably reducing the intake-air pressure on the downstream side of the throttle valve 7.

(Invention of Claim 26)

It offers the following effect in addition to that presented by the invention of claim 21.

<Effect> It is possible to alleviate the wasteful consumption of the engine oil.

As exemplified in FIG. 4(C), the breather chamber 56 has an inlet 56b arranged at a position deviated from just above a rocker arm 55 and lower than a bottom wall 56b of the breather chamber 56. Thus the engine oil hardly enters the breather chamber 56. This inhibits the engine oil from being taken out of the breather chamber 56 with the result of being able to alleviate the wasteful consumption of the engine oil.

BRIEF DESCRIPTION OF THE DRAWINGS

FIG. 1 shows a throttle body and its surrounding parts of an engine according to an embodiment of the present invention.

FIG. 4 shows a head cover and its surrounding parts of the engine according to the embodiment of the present invention.

FIG. 5 is a breather chamber and its surrounding parts of the engine according to the embodiment of the present invention.

FIG. 8 shows the throttle body of FIG. 1.

FIG. 10 shows the throttle body of FIG. 1.

MOST PREFERRED EMBODIMENT OF THE INVENTION

We will explain an embodiment of the present invention based on the attached drawings. FIGS. 1 to 10 show a multi-cylinder engine in accordance with the embodiment of the present invention. In this embodiment, an explanation is given for an upright water-cooling engine of three cylinders in series.

The embodiment of the present invention is outlined as follows.

Figure 7:
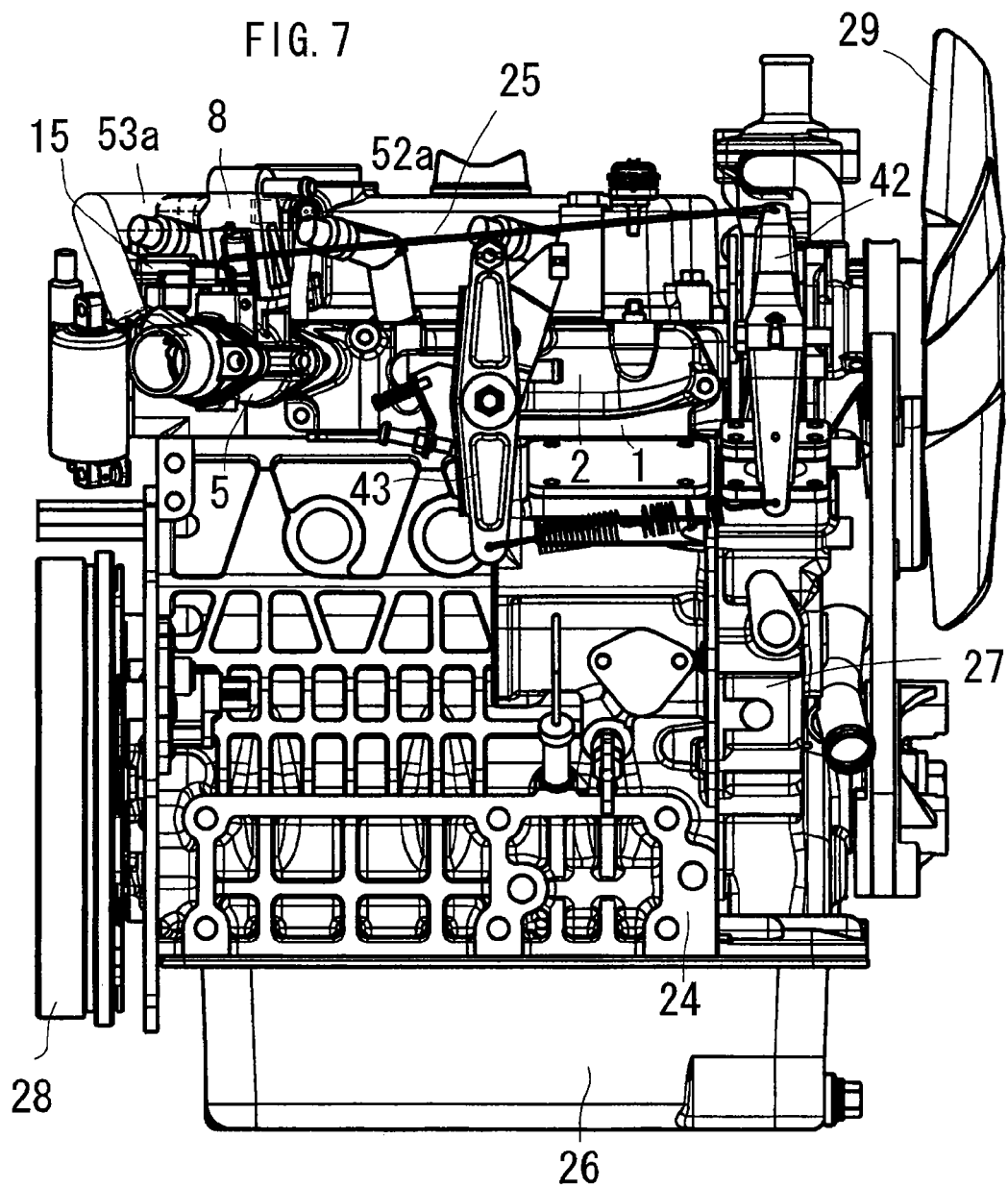
FIG. 7 is a side view of the engine of FIG. 6.

As shown in FIG. 7, this engine comprises a cylinder block 24 having an upper portion to which a cylinder head 1 is assembled. This cylinder head 1 has an upper portion to which a head cover 25 is assembled. An oil pan 26 is assembled to a lower portion of the cylinder block 24. The cylinder block 24 has a front portion to which a gear case 27 is assembled. A fly wheel 28 is arranged at a rear portion of the cylinder block 24. The engine is constructed as such. An engine-cooling fan 29 is disposed at a front portion of the gear case 27.

Figure 6:
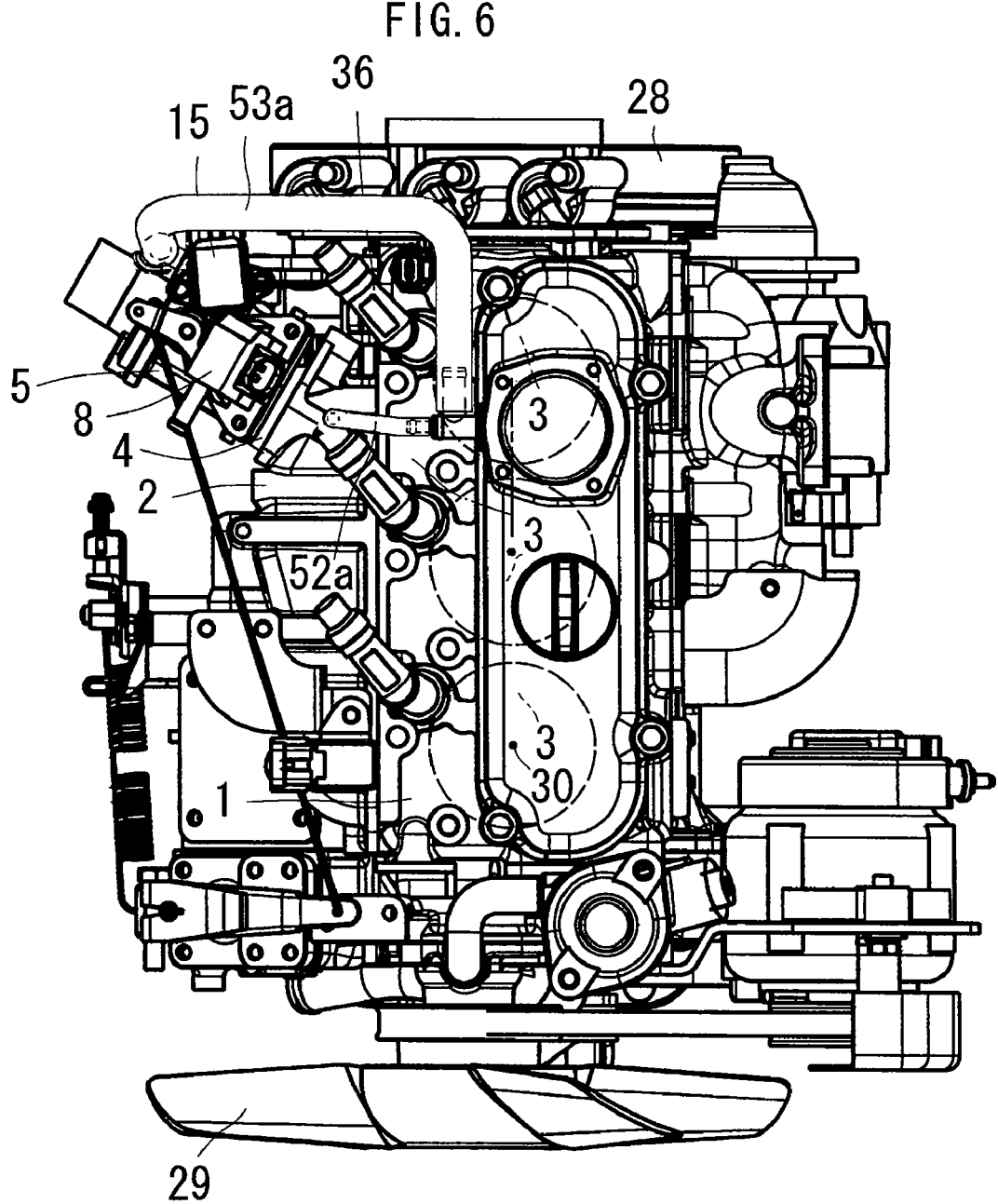
FIG. 6 is a top view of the engine according to the embodiment of the present invention.

As shown in FIG. 6, attached to the cylinder head 1 is an intake-air distribution passage 2 which distribute a fuel-air mixture to a plurality of cylinders 3. This intake-air distribution passage 2 has a single distribution passage inlet 4 to which a throttle body 5 is attached. Liquid fuel is supplied to this throttle body 5.

Although the intake-air distribution passage 2 is generally called as an intake-air manifold, it is of a box-shape having no branched pipe. Therefore, it is particularly called as "an intake-air distribution passage 2". As shown in FIG. 6, the number of cylinders 3 is three. These cylinders are called as a first cylinder, a second cylinder and a third cylinder from a side of the engine-cooling fan 29 in the mentioned order. The single distribution passage inlet 4 is arranged at an end portion on a side of the third cylinder of the intake-air distribution passage 2. As depicted in FIG. 6, when seen in a direction parallel to a cylinder center axis 30 and a side of the fly wheel 28 is deemed as the 'rear', the distributing passage inlet 4 is oriented slantly rearwards at an angle of 60 degrees with respect to a crank-shaft center axis 31 of a crank shaft. The liquid fuel that is supplied to the throttle body 5 is gasoline.

As for the ignition order, the first cylinder, the second cylinder and the third cylinder are ignited in the mentioned order and the ignition interval is about 240 degrees (of crank angle).

A fuel supply device is constructed as follows.

Figure 1A:
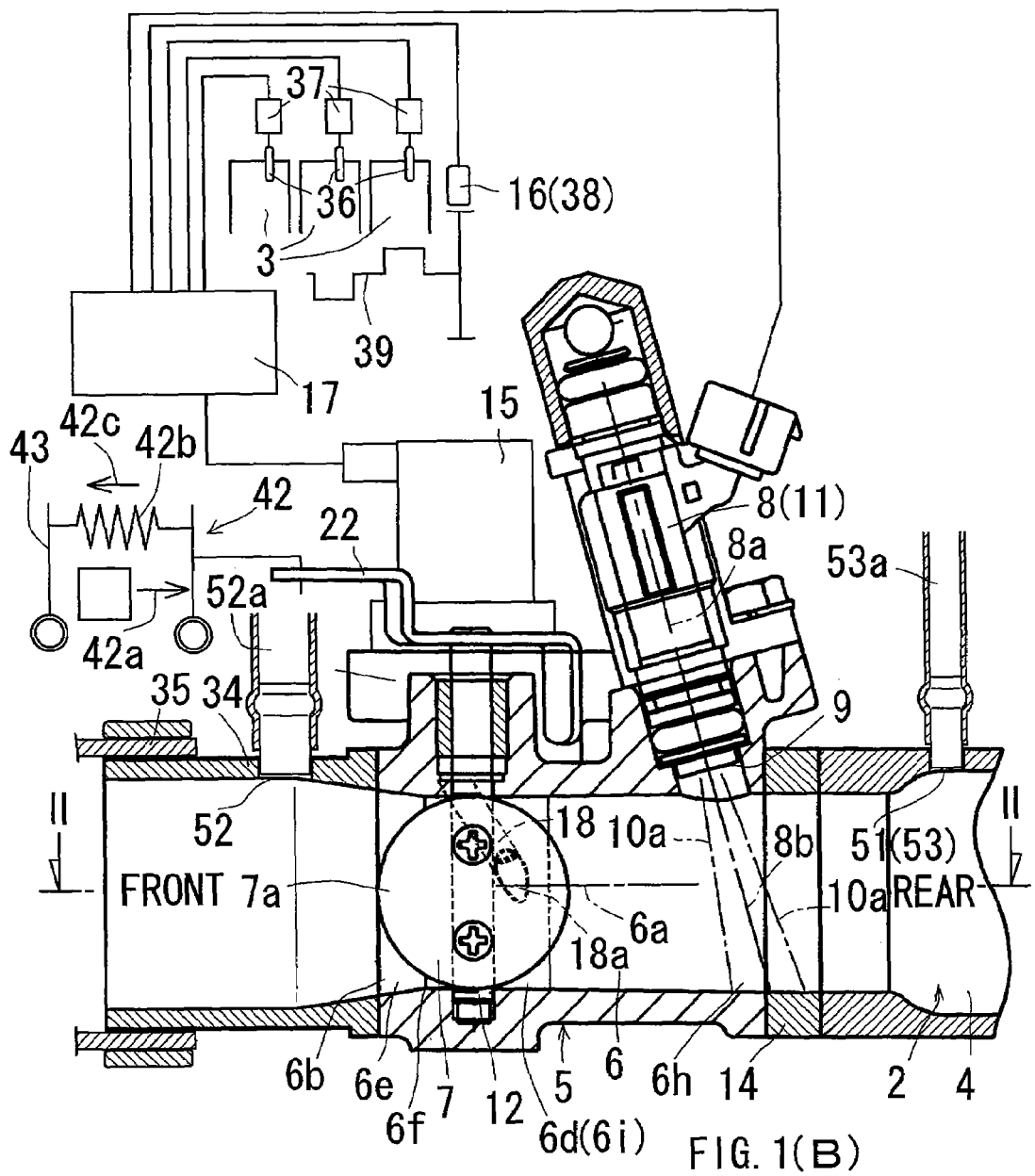
FIG. 1(A) is a vertical sectional side view and FIG. 1(B) is a view of a leading end portion of an injector when seen in a direction parallel to a center axis of the injector.
Figure 1B:
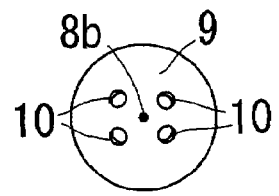

As shown in FIG. 1(A), the throttle body 5 has an interior area provided with a throttle intake-air passage 6, within which a throttle valve 7 is arranged. An injector 8 is attached to the throttle body 5. This injector 8 has the leading end portion 9 disposed opposite to an interior area of the throttle intake-air passage 6 downstream of the throttle valve 7 and is opened to provide a liquid-fuel injection hole 10 as shown in FIG. 1(B).

The throttle intake-air passage 6 has an intake-air passage inlet 6b to which an intake-air pipe connection tube 34 is attached. Connected to this intake-air pipe connection tube 34 is a lead-out end portion of the intake-air pipe 35 conducted out of an air cleaner (not shown). As shown in FIG. 7, the throttle valve 7 is interlockingly connected to a speed-control lever 43 through a mechanical governor 42.

A relationship between the throttle valve and the injector is as follows.

Figure 2A:
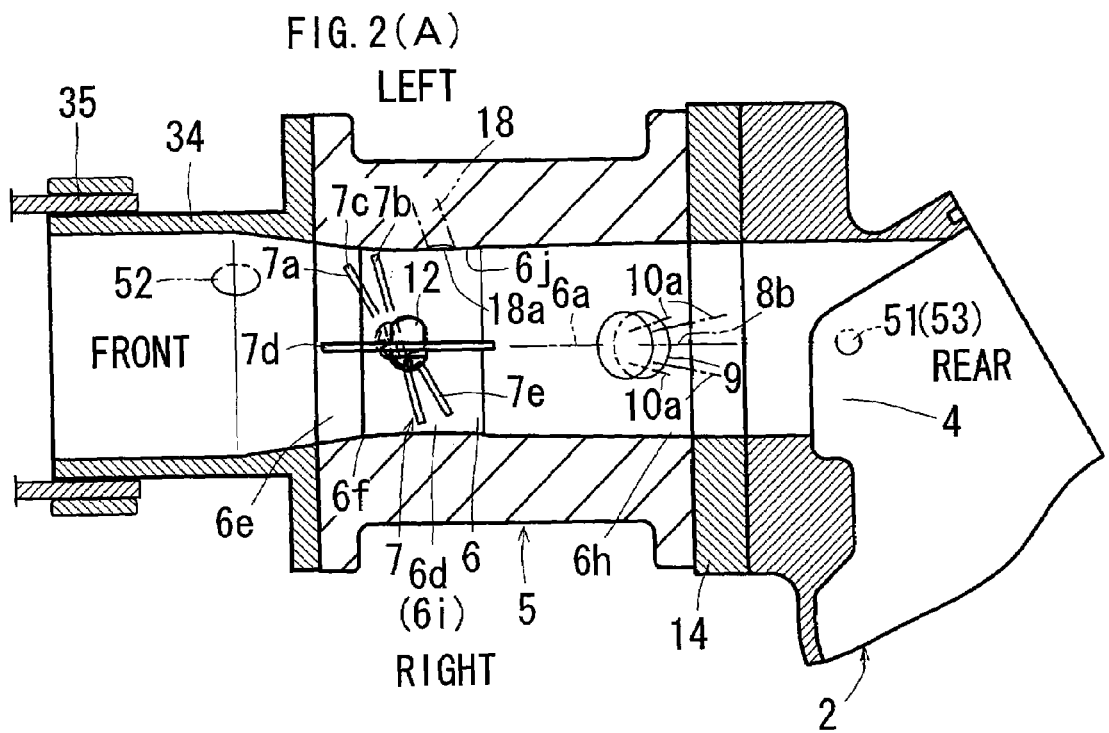
FIG. 2 (A) is a sectional view taken along a line II-II of FIG. 1(A) and FIG. 2(B) is an enlarged view in the vicinity of an inlet of an intake-air introduction passage.

As shown in FIG. 1(A) and FIG. 2(A), a direction in which the center axis 6a of the throttle intake-air passage extends is taken as a front and rear direction and a downstream side of an axis 12 of the throttle valve 7 is deemed as the 'rear'. A butterfly valve is used for the throttle valve 7 and the injector 8 has the leading end portion 9 arranged just behind the axis 12 of the throttle valve 7. An axis 8b of the injector 8 is imagined to extend from a center axis 8a of the injector 8 into the throttle intake-air passage 6 through the leading end portion 9 of the injector 8. The injector 8 is oriented so that the imaginary extending axis 8b of the injector 8 passes by just a rear position of the axis 12 of the throttle valve 7. The just rear position of the valve axis 12 means a position that has moved from the valve axis 12 rearwardly along the center axis 6a of the throttle intake-air passage 6 when seen in a direction parallel to the valve axis 12 as shown in FIG. 2.

A liquid fuel injection hole is constructed as follows.

As shown in FIG. 1(B), there are provided four liquid fuel injection holes 10. An injection axis 10a of a liquid fuel injection hole 10 is assumed to extend from each of the liquid fuel injection holes 10 into the throttle intake-air passage 6 as depicted in FIG. 1(A) and FIG. 2(A). The liquid fuel injection hole 10 is oriented so that the injection axis 10a of the liquid fuel injection hole 10 makes an angle of 15 degrees with respect to the assumed extending axis 8b of the injector 8. Thus the liquid fuel injected through the liquid fuel injection hole 10 passes by just the rear position or substantially just the rear position of the axis 12 of the throttle valve 7 so as to hardly receive the direct attack of high-speed intake air. From a first aspect of preventing the disturbance of the liquid fuel atomization, the above angle is advantageously not more than 30 degrees, more advantageously not more than 25 degrees, and most advantageously not more than 20 degrees. Further, from a second aspect of inhibiting the liquid fuel injected through every liquid fuel injection hole 10 from mutually overlapping and preventing oil drops of the liquid fuel from merging together to become large, the above angle is preferably at least 5 degrees, more preferably at least 7 degrees, and most preferably at least 10 degrees. Therefore, from the both aspects, the above angle is preferably at least 5 degrees and not more than 30 degrees, more preferably at least 7 degrees and not more than 25 degrees, and most preferably at least 10 degrees and not more than 20 degrees. The number of the liquid fuel injection holes 10 may be only one. In this case, the assumed extending line 8b of the injector 8 may coincide with the injection axis 10a of the liquid fuel injection hole 10.

The following structure concerns an injection direction of the injector.

As shown in FIG. 1(A), a cylindrical insulator 14 is interposed between the distribution passage inlet 4 of the intake-air distribution passage 2 and the intake-air passage outlet 13 of the throttle intake-air passage 6. The injector 8 provided with the liquid-fuel injection hole 10 is inclined so that its leading end portion 9 is directed to a downstream side of the throttle intake-air passage 6. The injector 8 has an extending axis 8b oriented to an inner peripheral surface of the insulator 14, so that the liquid fuel injected through the liquid-fuel injection hole 10 collides against the inner peripheral surface of the intake-air passage outlet 13 of the throttle intake-air passage 6 and the inner peripheral surface of the insulator 14.

Instead of this structure, the injector 8 may have its extending axis 8b oriented to the inner peripheral surface of the intake-air passage outlet 13 of the throttle intake-air passage 6, so that the liquid fuel injected through the liquid-fuel injection hole 10 collides against the inner peripheral surface of the intake-air passage outlet 13 of the throttle intake-air passage 6 and the inner peripheral surface of the insulator 14.

A control for the liquid fuel injection or the like has the following structure.

As shown in FIG. 1(A), the injector 8 is associated with an intake-air pressure sensor 15 which detects an intake-air pressure of the throttle intake-air passage 6 and with an engine rotation-number sensor 16 which detects the number of engine's rotations, through a control means 17. Based on the intake-air pressure and the number of engine's rotations, the above-mentioned control mean 17 controls the amount and injection timing of the liquid fuel to be injected from the injector 8 and the ignition timing or the like of an ignition plug 36 as shown in FIG. 6. Besides, the intake-air pressure sensor 15 also functions to detect an intake-air temperature. Based on the intake-air temperature, the control means 17 corrects the amount of the liquid fuel injected. The control means 17 is a micro-computer.

A structure relating to the intake-air pressure sensor is as follows.

As shown in FIG. 1(A), the intake-air pressure sensor 15 is attached to the throttle body 5 together with the injector 8. The throttle intake-air passage 6 of the throttle body 5 has a peripheral wall in which there is provided an intake-air pressure introduction passage 18 that introduces the intake-air pressure within the throttle intake-air passage 6, into the intake-air pressure sensor 15. The intake-air pressure introduction passage 18 has an inlet 18a arranged upstream of the injector 8 and downstream of the axis 12 of the throttle valve 7 and provided by opening an inner peripheral surface of the throttle intake-air passage 6.

The intake-air pressure introduction passage is oriented as follows.

Figure 9:
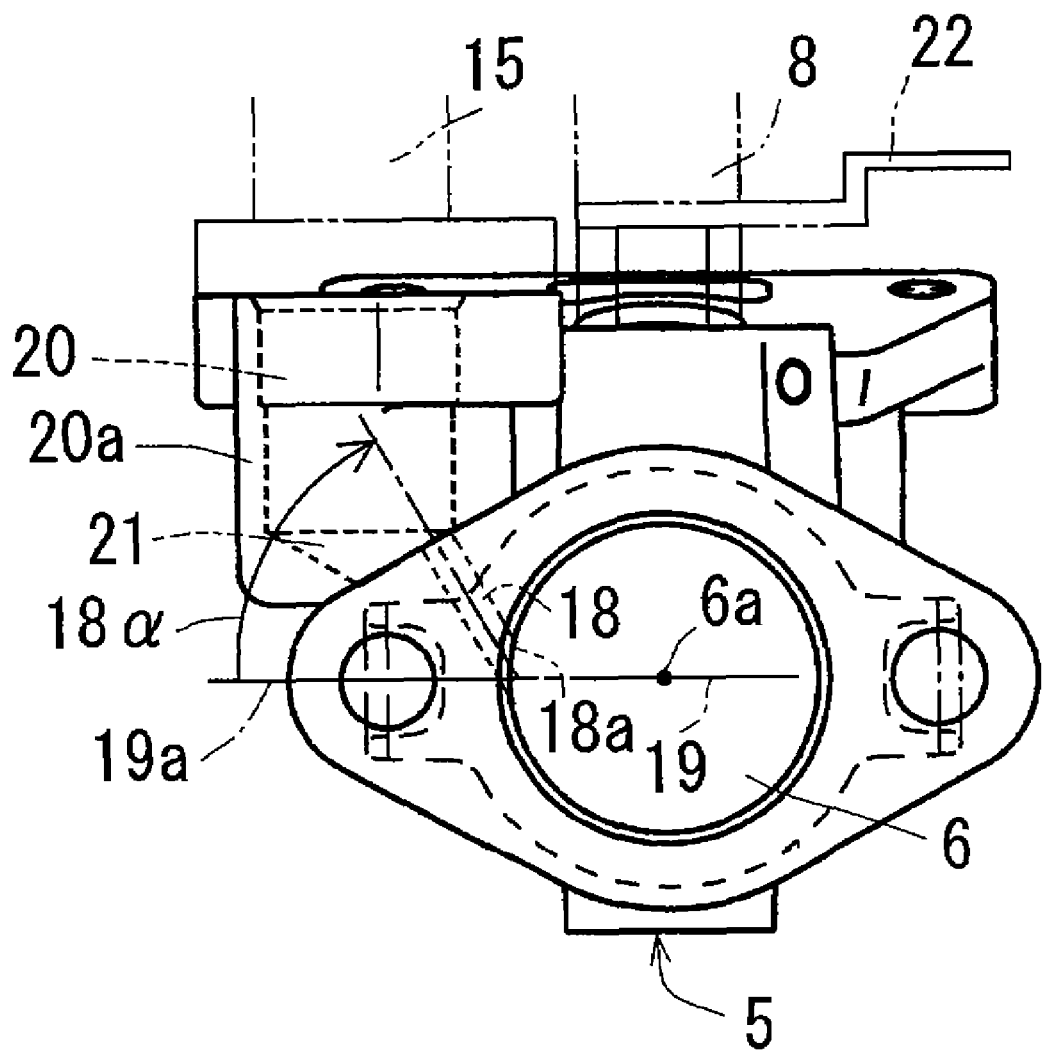
FIG. 9 is a view when seen in a direction indicated by an arrow (1X) in FIG. 8(B)

As shown in FIG. 9, an imaginary transverse line 19 crosses radially of the throttle intake-air passage 6, circular in section, and moves toward the inlet 18a of the intake-air pressure introduction passage 18 and an imaginary transverse extending line 19a goes from this imaginary transverse line 19 to an exterior area of the throttle intake-air passage 6 through the inlet 18a of the intake-air pressure introduction passage 18. The intake-air pressure introduction passage 18 formed by drilling is oriented so that it makes an angle of 60 degrees with respect to the imaginary extending line 19a. From a first view-point of making the direction of the intake-air pressure introduction passage 18 closer to the tangent direction of the throttle intake-air passage 6 than to the radial direction thereof and enabling the inlet 18a of the intake-air pressure introduction passage 18 to take a large sectional area of its opening even if the intake-air pressure introduction passage 18 has a reduced sectional area, the above angle is advantageously at least 45 degrees, more advantageously at least 50 degrees and most advantageously at least 55 degrees. Further, from a second view-point of preventing the disadvantage that the direction of the intake-air pressure introduction passage 18 approaches too much to the tangent direction of the inner peripheral surface of the throttle intake-air passage 6 and easily forming the intake-air pressure introduction passage 18 by drilling, the above angle is preferably not more than 75 degrees, more preferably not more than 70 degrees and most preferably not more than 65 degrees. Thus from the both view-points, the angle is preferably at least 45 degrees and not more than 75 degrees, more preferably at least 50 degrees and not more than 70 degrees, and most preferably at least 55 degrees and not more than 65 degrees.

As shown in FIG. 9, on the projected drawing whose surface is perpendicular to the center axis 6a of the throttle intake-air passage 6, the intake-air pressure introduction passage 18 is oriented so that it makes an angle (18α) of 60 degrees with respect to the transverse extending line 19a. From a first aspect of avoiding the disadvantage that the direction of the intake-air pressure introduction passage 18 comes too close to the axial direction of the throttle intake-air passage 6 to unnecessarily lengthen the intake-air pressure introduction passage 18 and making it easy for the intake-air introduction passage 18 to be formed by drilling, this angle (18α) is preferably at least 45 degrees, more preferably at least 50 degrees, and most preferably at least 55 degrees. Besides from a second aspect of inhibiting the disadvantage that the direction of the intake-air pressure introduction passage 18 approaches too much to the tangent direction of the inner peripheral surface of the throttle intake-air passage 6 and making it easy for the intake-air introduction passage 18 to be formed by drilling, this angle (18α) is preferably not more than 75 degrees, more preferably not more than 70 degrees, and most preferably not more than 65 degrees. Thus from the both aspects, the angle (18α) is preferably at least 45 degrees and not more than 75 degrees, more preferably at least 50 degrees and not more than 70 degrees, and most preferably at least 55 degrees and not more than 65 degrees.

A butterfly valve is used for the throttle valve 7. As shown in FIG. 10(B), on the projected drawing where the inlet 18a of the intake-air pressure introduction passage 18 is in parallel to the center axis 6a of the throttle intake-air passage 6 and the axis 12 of the throttle valve 7, the inlet 18a of the intake-air pressure introduction passage 18 is arranged so that it overlaps the center axis 6a of the throttle intake-air passage 6.

This intake-air pressure introduction passage 18 is inclined from its outlet 18b toward its inlet 18a downwardly. An imaginary line 6c extends from the center axis 6a of the throttle intake-air passage 6 to the exterior area of the throttle intake-air passage 6 through the inlet 6b of the throttle intake-air passage 6. As shown in FIG. 5(B), on the projected drawing whose surface is in parallel to the center axis 6a of the throttle intake-air passage 6 and to the axis of the throttle valve 7, the intake-air pressure introduction passage 18 is oriented so that it makes the angle (18α) of 60 degrees with respect to the extending axis 6c of the throttle intake-air passage 6.

From a first aspect of allowing the liquid fuel that has entered the intake-air pressure introduction passage 18 to flow out by its own weight, this angle (18α) is preferably at least 45 degrees, more preferably at least 50 degrees, and most preferably at least 55 degrees. Besides from a second aspect of lengthening the intake-air introduction passage 18 in the axial direction of the throttle intake-air passage 6 and enabling the inlet 18a of the intake-air pressure introduction passage 18 to take a larger sectional area of its opening than the sectional area of the intake-air pressure introduction passage 18, this angle (18β) is preferably not more than 75 degrees, more preferably not more than 70 degrees, and most preferably not more than 65 degrees. Thus from the both aspects, the angle (18β) is preferably at least 45 degrees and not more than 75 degrees, more preferably at least 50 degrees and not more than 70 degrees, and most preferably at least 55 degrees and not more than 65 degrees.

A hole for attaching the intake-air pressure sensor has the following structure.

Figure 10A:
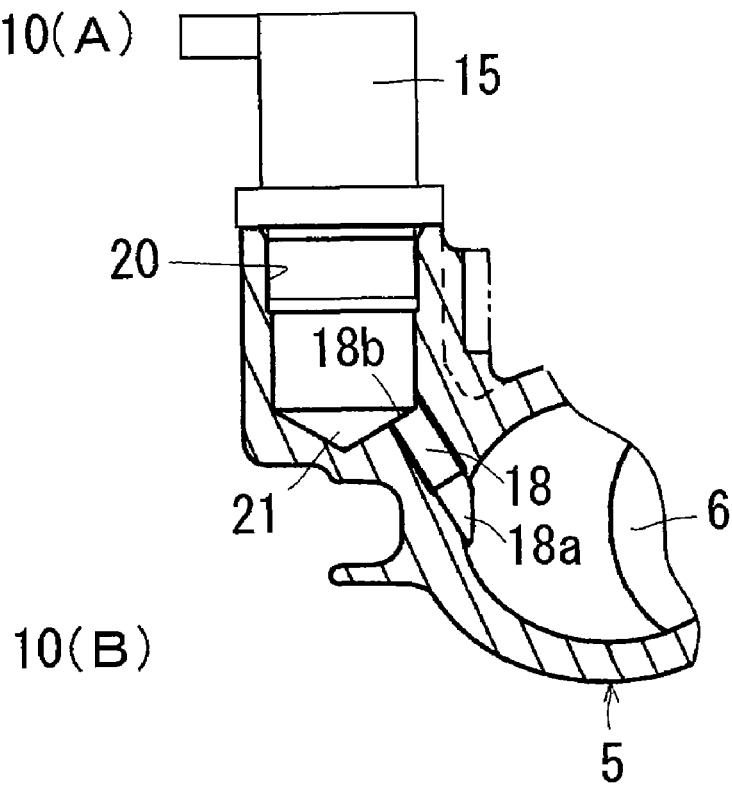
FIG. 10(A) is a sectional view taken along a line X-X in FIG. 8
Figure 10B:
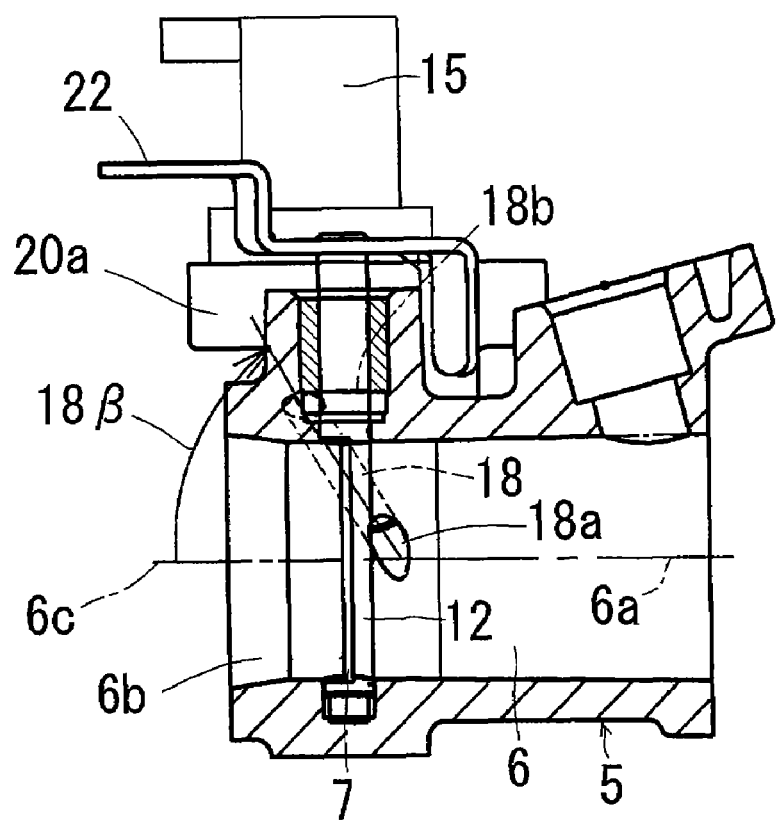
FIG. 10(B) is a vertical sectional side view of the throttle body.

As shown in FIG. 10(A), the throttle body 5 is opened to provide a hole 20 for attaching the intake-air pressure sensor 15 and is communicated with the intake-air pressure introduction passage 18. The attaching hole 20 is formed to face downwardly and is provided with a liquid fuel reservoir 21 therebelow. The intake-air pressure sensor 15 is attached to this attaching hole 20. The liquid fuel reservoir 21 has an upper portion opened to provide the outlet 18b of the intake-air pressure introduction passage 18.

The parts attached to the throttle body are arranged as follows.

Figure 8A:
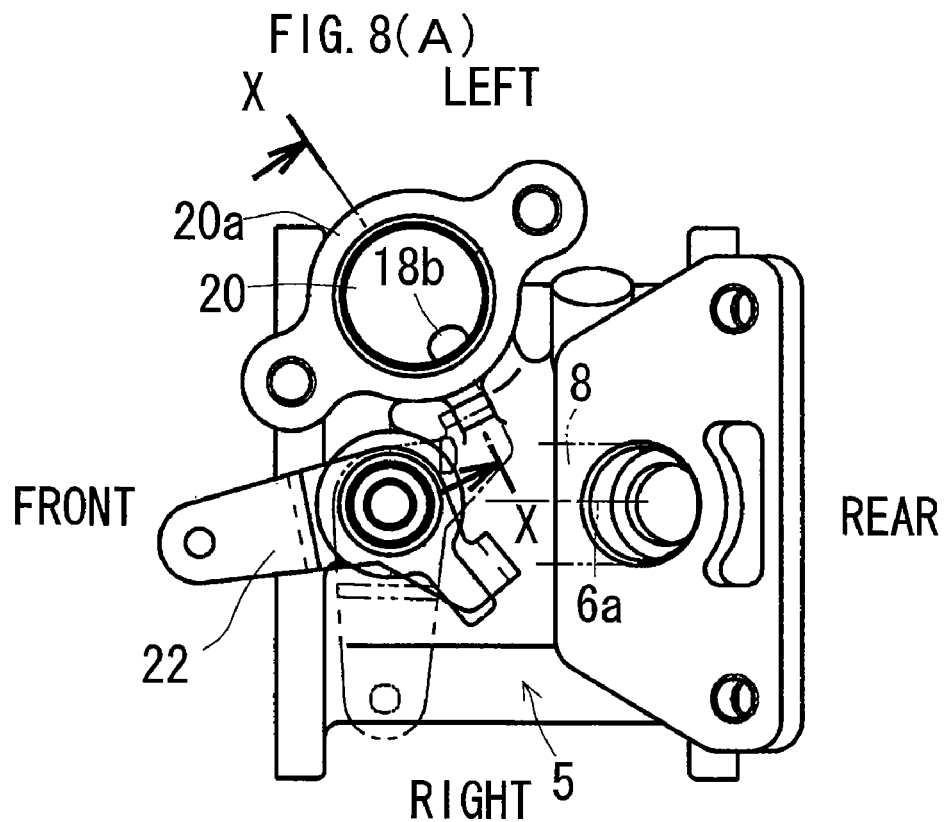
FIG. 8(A) is a top view and FIG. 8(B) is a side view.
Figure 8B:
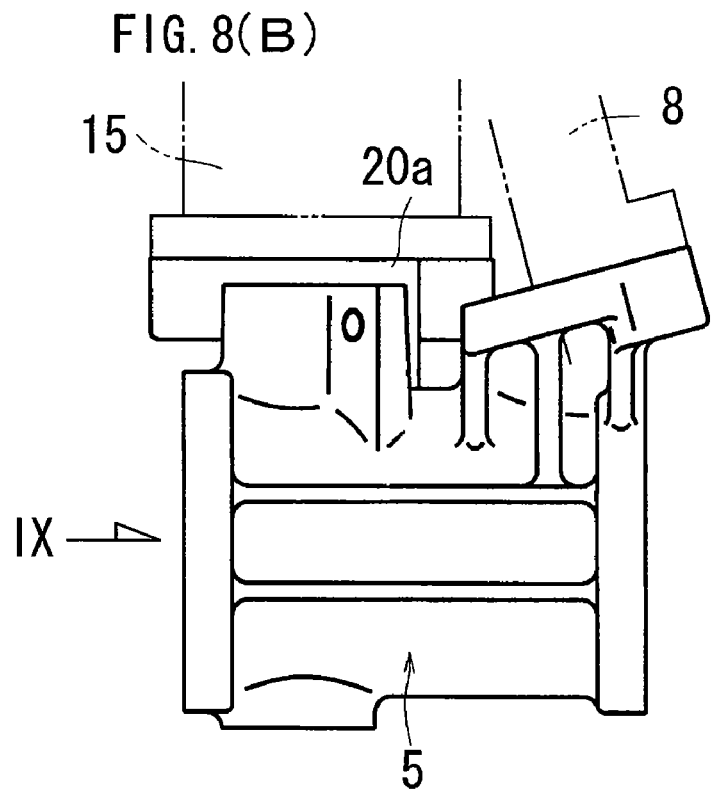

As shown in FIG. 8(A), the direction of the center axis 6a of the throttle intake-air passage 6 is taken as the front and rear direction. The downstream side of the axis 12 of the throttle valve 7 is deemed as the 'rear'. When seen in the direction parallel to the axis 12 of the throttle valve 7, a direction perpendicular to the front and rear direction is deemed as a left and right lateral direction. The injector 8 is arranged behind the throttle input arm 22 and a boss 20a of the attaching hole 20 for the intake-air pressure sensor 15 is disposed laterally of the throttle input arm 22. The boss 20a of the attaching hole 20 for the intake-air pressure sensor 15 also serves as a stopper for the pivotal movement of the throttle input arm 22.

The fuel supply is outlined as follows.

As shown in FIG. 1(A), the throttle valve 7 of butterfly-type is positioned within the throttle intake-air passage 6 and is interlockingly connected to a mechanical governor 42. Based on a degree of the opening of the throttle valve 7, the amount of intake air is adjusted. The control means 17 supplies from the fuel supply means 11 to the intake air, the fuel of the amount in proportion to the intake-air amount calculated based on the intake-air pressure of the throttle intake-air passage 6 and the number of the engine's rotations. The mechanical governor 42 is interlockingly connected to the speed-control lever 43.

When the engine is in operation at a low speed with a light load where the throttle valve 7 exists at the slightly-open position 7c, as shown in FIG. 2(A), a governing force 42 is small and therefore a spring force 42c of a governing spring 42b, which balances the governing force 42, is small. Consequently, even if the load increases, the throttle valve 7 opens at a low speed.

The throttle body is devised as follows.

As shown in FIG. 2(A), the throttle intake-air passage 6 has the inner peripheral surface, a part of which is an annular inner peripheral surface of a predetermined width around the throttle valve 7. This annular inner peripheral surface is called as a valve-surrounding inner peripheral surface 6d. An annular inner peripheral surface adjacent the valve-surrounding inner peripheral surface 6d is taken as an adjacent inner peripheral surface 6e. The throttle valve 7 has a portion most distant from the valve axis 12, which is taken as a pivotal end portion 7a. The adjacent inner peripheral surface 6e is formed so that as it goes further and further away from an end edge 6f of the valve-surrounding inner peripheral surface 6d, a passage defined by itself has a sectional area (its inner diameter) increasing progressively. When the engine is in operation at a low speed with a light load, the throttle valve 7 existing at the slightly-open position 7c has its pivotal end portion 7a swing within the adjacent inner peripheral surface 6e.

In this engine, the full-closed position 7b has 0% degrees of opening and the full-open position 7d has 100% degrees of opening. An angle therebetween is divided by 100. And in the case where a ratio of the angle opened from the full-closed position 7b is deemed as a degree of opening, an slightly-open position 7c is said to be, for example, a range within which a degree of opening is 10 to 40%, 20 to 40%, 30 to 40% or the like.

As shown in FIG. 2(A), the adjacent inner peripheral surface 6e is tapered as a trusted cone, a passage defined by which has a sectional area (inner diameter) increasing progressively from the upstream end edge 6f of the valve-surrounding inner peripheral surface 6d toward the upstream side.

A fuel supply control is devised as follows.

As shown in FIG. 1(A), the throttle body 5 is formed with the intake-air pressure introduction passage 18, the inlet 18a of which is provided by opening the inner peripheral surface of the throttle intake-air passage 6. The intake-air pressure of the throttle intake-air passage 6 is introduced into the intake-air pressure sensor 15 through the intake-air pressure introduction passage 18. This intake-air pressure sensor 15 and the engine rotation-number sensor 16 are associated with a fuel supply means 11 via the control means 17. Based on the intake-air pressure of the throttle intake-air passage 6 and the detection of the number of engine's rotations, the control means 17 supplies from the fuel supply means 11, the fuel of the amount in proportion to the intake-air amount to the intake air.

Concretely, the intake-air amount is calculated based on the intake-air pressure and the number of engine's rotations. Based on the calculated intake-air amount, necessary supply amount of the fuel is calculated and the calculated amount of fuel is supplied to the intake air.

The intake-air pressure sensor 15 has a function of detecting the intake-air temperature and the control means 17 corrects the injection amount of the liquid fuel based on the detected intake-air temperature. The control means 17 is a micro-computer.

Figure 2B:
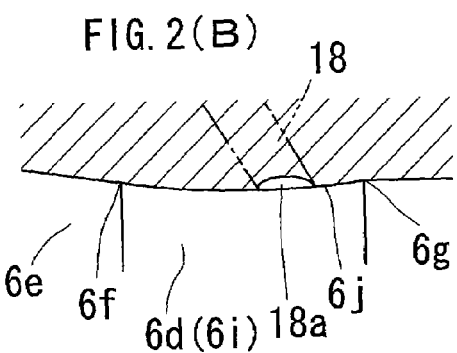

As shown in FIG. 2(B), the valve-surrounding inner peripheral surface 6d of the throttle intake-air passage 6 is formed as a venturi portion 6i, which is opened to provide the inlet 18a of the intake-air pressure introduction passage 18.

This venturi portion 6i has a passage of a circular sectional area. Each of the upstream end edge 6f, the downstream end edge 6g and the central portion has a diameter reduced progressively by 1 mm in the mentioned order.

The venturi portion 6i may be provided at another position separate from the valve-surrounding inner peripheral surface 6d as far as it is positioned in the inner peripheral surface of the intake-air passage.

As shown in FIG. 2(A), a radial direction of the throttle intake-air passage 6 perpendicular to the axis 12 of the throttle valve 7 is taken as a left and right lateral direction. In order to arrange the inlet 18a of the intake-air pressure introduction passage 18 in a lateral inner peripheral surface of the throttle intake-air passage 6, when the throttle valve 7 exits at the full-closed position 7b, it is partitioned in the left and right direction with the valve axis 12 positioned as a boundary to form left and right lateral half portions, one half portion of which is directed toward the downstream side from the axis 12 of the throttle valve 7 when the throttle valve 7 is open, to form a downstream-oriented half portion 7e. While the throttle valve 7 is opening, the downstream-oriented half portion 7e moves to a lateral inner peripheral surface of the throttle intake-air passage 6. The intake-air pressure introduction passage 18 has the inlet 18a arranged in another lateral inner peripheral surface 6i opposite to the lateral inner peripheral surface.

A device is made so as to uniformly distribute the intake air to a cylinder.

Figure 3:
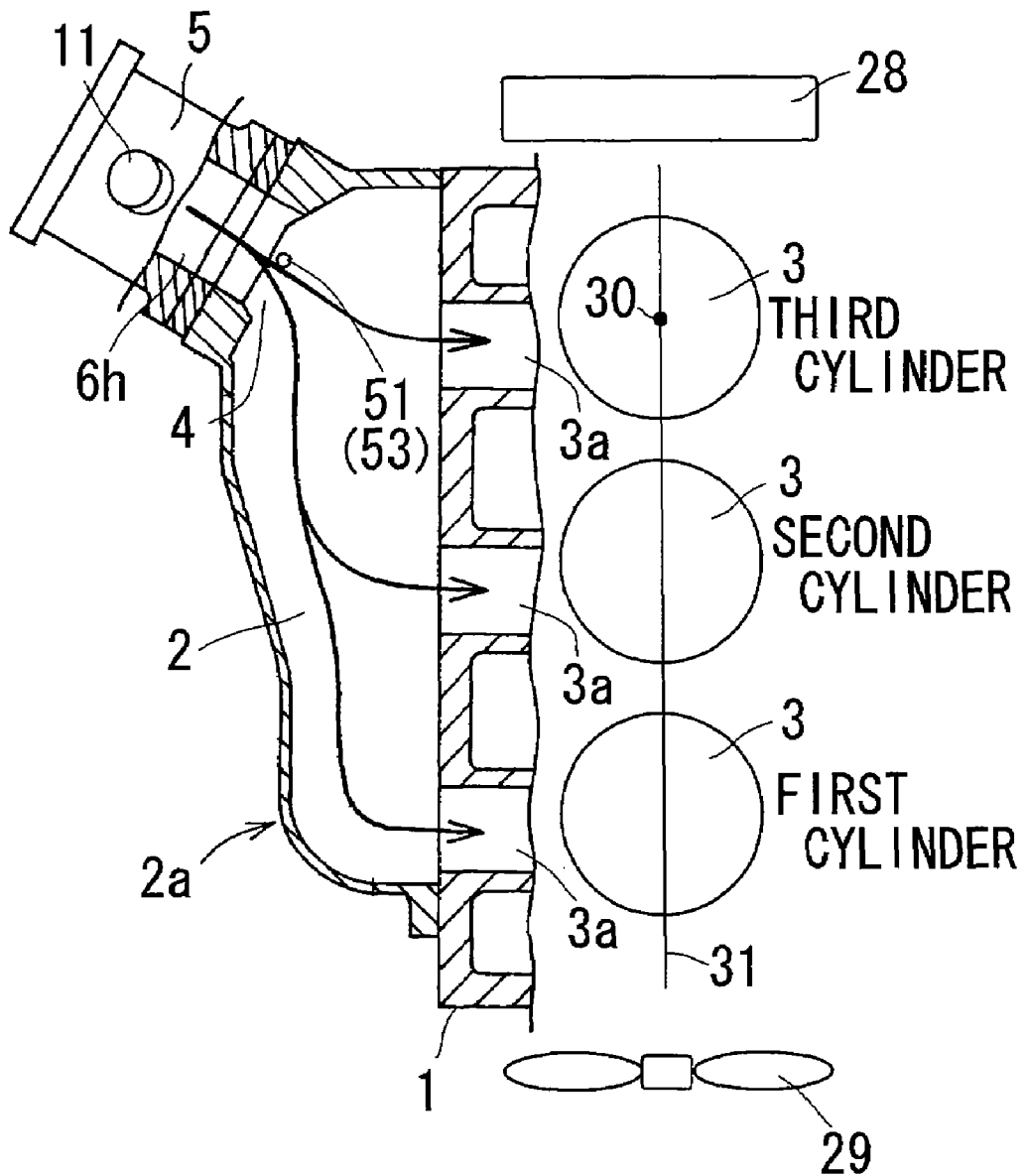
FIG. 3 shows a intake-air distribution passage and its surrounding parts of the engine according to the embodiment of the present invention.

As shown in FIG. 3, three cylinders are provided.

Attached to the cylinder head 1 is an intake-air distribution passage 2 which has a single distribution passage inlet portion 4. A single throttle body 5 is attached to the distribution passage inlet portion 4.

As shown in FIG. 1(A) or FIG. 2(A), a breather outlet 51 is opposite to an interior area of the distribution passage inlet portion 4.

In this engine, since the intake air within the distribution passage inlet portion 4 was already provided with the fuel to form a fuel-air mixture, the air and the blow-by gas within the crank case to be sucked out of the breather outlet 51 is flowed out to the intake-air distribution passage 2 while being mixed with the fuel-air mixture within the distribution passage inlet portion 4 and is distributed uniformly to every cylinder 3. This makes it possible to uniformize the air to fuel ratio of the mixture to every cylinder 3.

The breather outlet 51 may be arranged opposite not only to the distribution passage inlet portion 4 of the intake-air distribution passage 2 but also to a suitable position as far as it is within a region extending from an outlet 6h of the throttle intake-air passage 6 to the inlet portion 4 of the intake-air distribution passage 2.

As shown in FIG. 2(A), the direction of the center axis 6a of the throttle valve 6 is taken as the front and rear direction and the downstream side of the axis 12 of the throttle valve 7 is deemed as the 'rear'. When seen in the direction parallel to the axis 12 of the throttle valve 7, the breather outlet 51 is arranged just behind the valve axis 12.

In this engine, the intake air which passes nearby the breather outlet 51 has been already fed with the fuel to form the fuel-air mixture. Therefore, the air and the blow-by gas within the crank case to be sucked out of the breather outlet 51 is involved in the mixture by a turbulent flow produced just behind the valve axis 12 to be dispersed into the mixture evenly and introduced into the intake-air distribution passage 2. This makes it possible to uniformize the fuel to air ratio of the mixture to be distributed to every cylinder 3.

The position just behind the valve axis 12 is a position moved from the valve axis 12 rearwardly along the center axis 6a of the throttle intake-air passage 6 when seen in the direction parallel to the valve axis 12.

As shown in FIG. 1(A), every cylinder 3 is provided with an ignition plug 36 having an ignition circuit 37, which is interlockingly connected to a crank-shaft phase sensor 38 through the control means 17. When the control means 17 performs an ignition-timing control to throw sparks from the ignition plug 36 at every predetermined timing of a combustion cycle of every cylinder 3, the ignition timing is made earlier for the cylinder 3 of a lower compression ratio.

In this engine, as the cylinder 3 is positioned further away from the throttle body 5, its compression ratio becomes lower. The first cylinder 3 has the lowest compression ratio and the third cylinder has the highest compression ratio. The second cylinder has a compression ratio as high as an intermediate one therebetween.

In this engine, the ignition timing is set within a range of 30 degrees to 15 degrees (of crank angle) before an upper dead center of the compression stroke.

For example, with a predetermined number of rotations and a predetermined load, the first cylinder, the second cylinder and the third cylinder are ignited at crank angles of 23 degrees, 21 degrees and 19 degrees, respectively, before the upper dead center of the compression stroke.

A control system is as follows.

The control means 17 controls the ignition timing for every cylinder 3 based on an ignition-timing control map by resorting to the number of engine's rotations, the intake-air pressure of the throttle intake-air passage 6 and the detected phase of the crank shaft 39.

More specifically, the control means 17 performs the ignition-timing control based on a mutually different ignition-timing map for every cylinder 3.

Each of the ignition-timing control maps stores data which include input values of the number of engine's rotations and the intake-air pressure of the throttle intake-air pressure 6 and output values of the optimum ignition timing for every cylinder when the engine is in operation at a predetermined speed and with a predetermined load corresponding to these input values.

The fuel supply is devised as follows.

A single fuel supply means 11 is arranged opposite to an interior area of the throttle intake-air passage 6 and is interlockingly connected to a crank-shaft phase sensor 38 through the control means 17. When the control means 17 performs the control of the fuel, which is supplied to every cylinder 3, from the single fuel supply means 11 to the intake air within the interior area 6 of the throttle intake-air passage 6 based on the detected phase of the crank shaft 39 at every predetermined timing of the combustion cycle of every cylinder, if the fuel supply amount is the same, more fuel is supplied to the cylinder 3 in which the mixture has a lower fuel concentration.

In this engine, with the same fuel supply amount, the lower the fuel concentration of the mixture to be supplied to the cylinder 3, the further the cylinder is positioned away from the throttle body 5. The fuel of the lowest concentration is supplied to the first cylinder 3 and the fuel of the highest concentration is fed to the third cylinder 3. The fuel supplied to the second cylinder has a concentration middle between them.

The fuel supply means 11 may be disposed opposite to an appropriate position within a region extending from the throttle intake-air passage 6 to the distribution passage inlet portion 4 of the intake-air distribution passage 2.

Since this engine utilizes the injector 8 for the fuel supply means 11, with the same fuel injection amount, more fuel is injected to the cylinder 3 where the mixture has a lower fuel concentration.

Further, in the case of the identical fuel-supply start-timing, the fuel supply is conducted earlier to the cylinder 3 where the mixture has a lower fuel concentration.

This engine employs the injector 8 for the fuel supply means 11. Therefore, with the same fuel injection start-timing, the fuel injection starts earlier to the cylinder 3 where the mixture has a lower fuel concentration.

This engine sets the fuel injection start-timing to within a range of 50 degrees (of crank angle) before an upper dead center of the intake stroke to 50 degrees (of crank angle) after the upper dead center of the intake stroke.

For example, with the predetermined number of engine's rotations and the predetermined load, the fuel supply is carried out to the first cylinder at an angle of 10 degrees before the upper dead center of the intake stroke, to the second cylinder at the upper dead center of the intake stroke, and to the third cylinder at an angle of 10 degrees after the upper dead center of the intake stroke.

The control system is as follows.

The control means 17 controls the fuel supply to every cylinder 3 based on the fuel supply control map by resorting to the number of engine's rotations, the intake-air pressure of the throttle intake-air passage 6 and the detected phase of the crank shaft 39.

More specifically, the control means 17 controls the fuel supply to every cylinder 3 based on the mutually different fuel supply control map for every cylinder 3.

Each of the fuel supply control maps stores data which include input values of the number of engine's rotations and the intake-air pressure of the throttle intake-air passage 6 and output values of the optimum fuel injection start-timing for every cylinder when the engine is in operation at a predetermined speed and with a predetermined load corresponding to these input values.

Since this engine uses the injector 8 for the fuel supply means 11, the control means 17 controls the fuel injection to every cylinder 3 based on the fuel-injection control map.

As shown in FIG. 3, the cylinder head 1 has a side surface to which a longitudinal box-shaped intake-air passage wall 2a extending along a direction of arranging the cylinders 3 is attached. The box-shaped intake-air passage wall 2a has an interior area formed with an intake-air distribution passage 2 continuing straightly in a longitudinal direction. The respective cylinders 3 have the intake-air port inlets 3a opposite to the interior area of the intake-air distribution passage 2 while being spaced at a predetermined interval in the longitudinal direction.

In this engine, the intake air passing through the intake-air distribution passage 2 has been already fed with the fuel to form the mixture, so that the mixture hardly stagnates within the intake-air distribution passage 2, thereby enabling the fuel-air ratio of the mixture distributed to every cylinder 3 to be uniformized.

The intake-air distribution passage 2 has a sectional area, the largest portion of which is close to the throttle body 5, the most distant portion is the smallest and the intermediate portion is of a middle size therebetween.

The breather device is devised as follows.

As shown in FIG. 1(A), when an upstream breather outlet 52 is provided by opening an upstream side of the throttle valve 7, a downstream breather outlet 53 is provided by opening a downstream side of the throttle valve 7.

The upstream breather outlet 52 is arranged upstream of the inlet 18a of the intake-air pressure introduction passage 18 and the downstream breather outlet 53 is positioned downstream of the inlet 18a of the intake-air pressure introduction passage 18, thereby enabling the engine oil contained in the blow-by gas to hardly clog the inlet 18a of the intake-air pressure introduction passage 18.

Figure 4A:
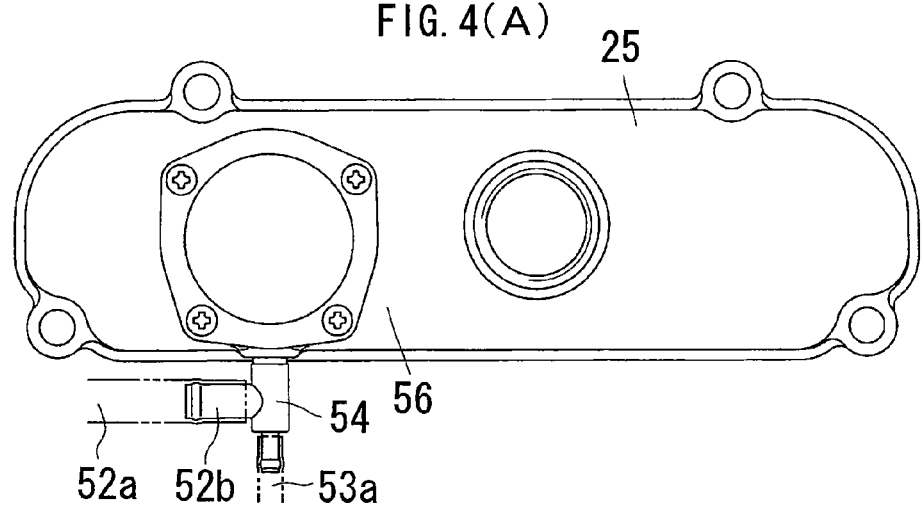
FIG. 4(A), FIG. 4(B) and FIG. 4(C) are a top view, a bottom view and a vertical sectional side view, respectively.
Figure 4B:
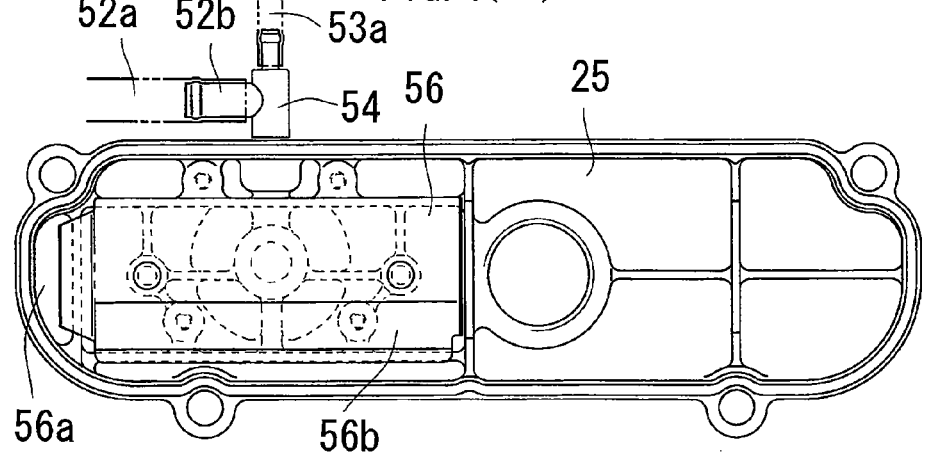

As shown in FIGS. 4(A) and 4(B), a common breather passage 54 is conducted out of a breather chamber 56. The common breather passage 54 is branched into an upstream breather passage 52a and a downstream breather passage 53a.

Figure 5A:
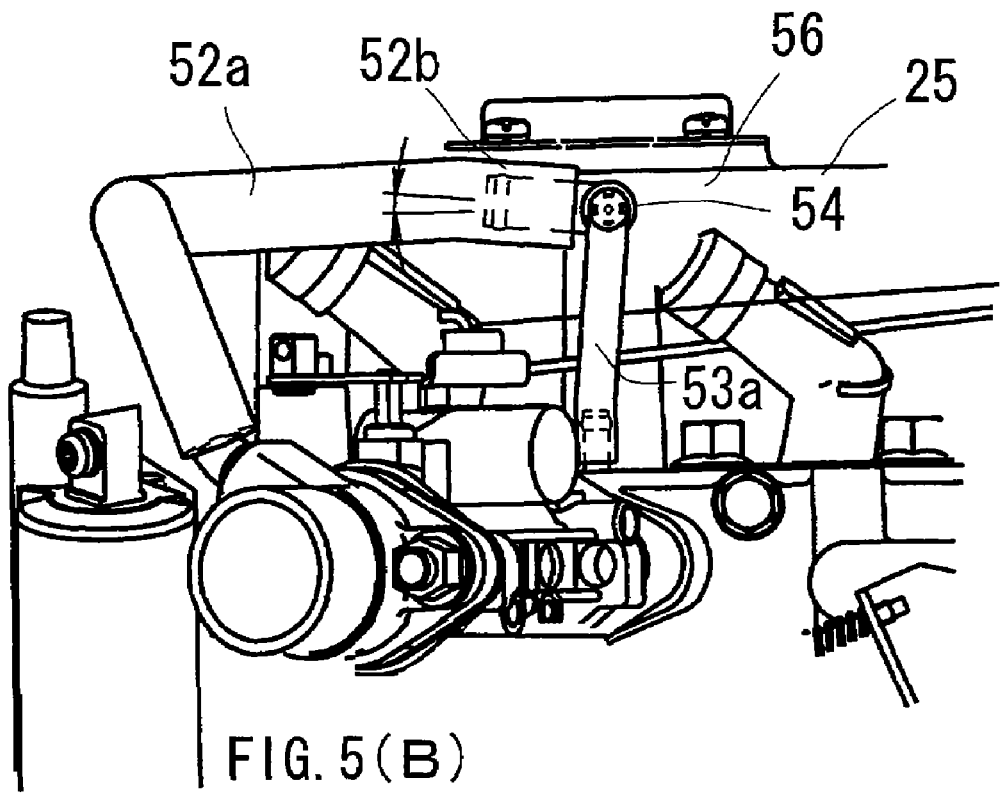
FIG. 5(A) is a side view and FIG. 5(B) is a rear view.
Figure 5B:
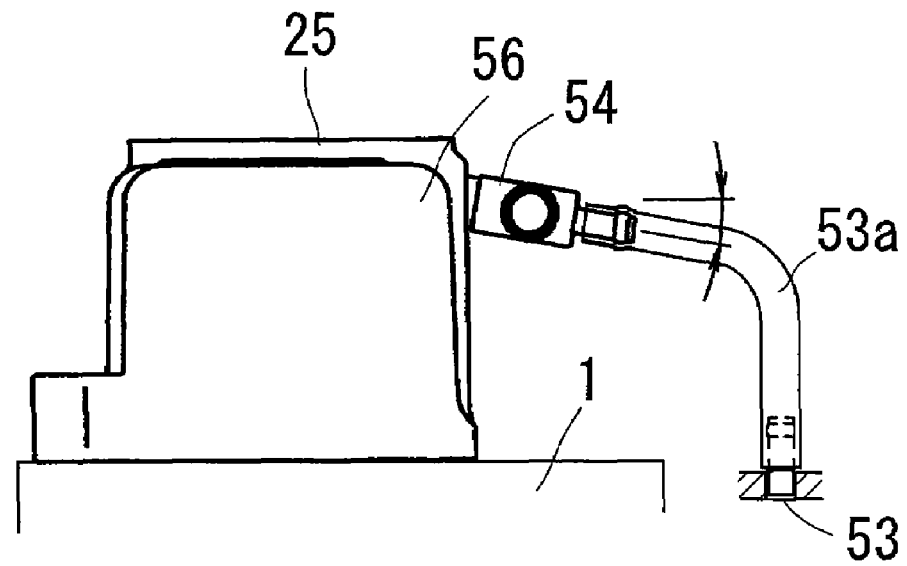

As shown in FIG. 5(A), the upstream breather passage 52a projecting from the common breather passage 54 has a starting end portion 52b oriented upwards.

The upstream breather passage 52a has the starting end portion 52b inclined obliquely upwardly from the common breather passage 54.

As shown in FIG. 5(B), the downstream breather passage 53a is oriented downwardly from an end conducted out of the common breather passage 54 to the downstream breather outlet 53.

As illustrated in FIG. 1(A), the upstream breather outlet 52 is communicated with the breather chamber 56 by the upstream breather passage 52a, and the downstream breather outlet 53 is communicated with the breather chamber 56 by the downstream breather passage 53a. The downstream breather passage 53a is smaller than the upstream breather passage 52a in sectional area.

Figure 4C:
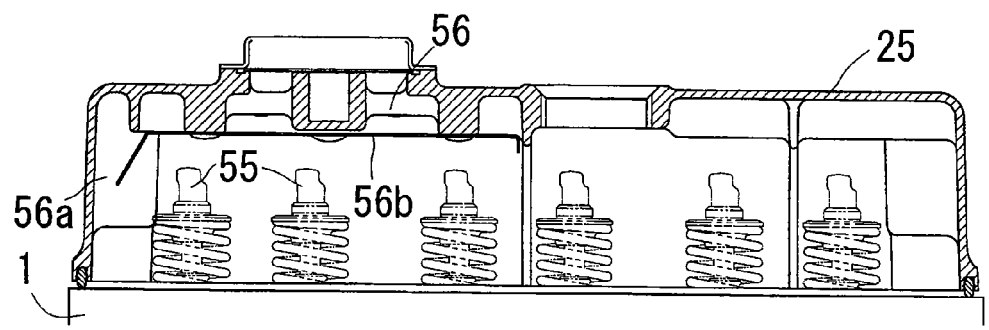

As shown in FIG. 4(C), the cylinder head 1 has an upper portion to which a head cover 25 is attached. This head cover 25 covers a rocker arm 55 and has a ceiling portion. When the breather chamber 56 is arranged at the ceiling portion, the breather chamber 56 has an inlet 56a arranged at a position deviated from just above the rocker arm 55 and lower than a bottom wall 56b of the breather chamber 56.

What is claimed is:

1. A multi-cylinder engine comprising a cylinder head (1) to which an intake-air distribution passage (2) is attached, the intake-air distribution passage (2) distributing a fuel-air mixture to a plurality of cylinders (3) and having a single distribution passage inlet (4) to which a throttle body (5) is attached, liquid fuel being supplied to the throttle body (5), wherein the throttle body (5) has an interior area provided with a throttle intake-air passage (6), within which a throttle valve (7) is arranged, an injector (8) being attached to the throttle body (5) and having a leading end portion (9) which is positioned opposite to an interior area of the throttle intake-air passage (6) downstream of the throttle valve (7) and is opened to provide a liquid-fuel injection hole (10), an intake-air pressure sensor (15) that detects an intake-air pressure of the throttle intake-air passage (6) and an engine's rotation-number sensor (16) that detects the number of engine's rotations being associated with the injector (8) through a control means (17), the control means (17) controlling an amount of the liquid fuel to be injected from the injector (8), based on the intake-air pressure and the number of engine's rotations, the intake-air pressure sensor (15) being attached to the throttle body (5) together with the injector (8), the throttle intake-air passage (6) of the throttle body (5) having a peripheral wall in which there is provided an intake-air pressure introduction passage (18) for introducing the intake-air pressure within the throttle intake-air passage (6) to the intake-air pressure sensor (15), an inner peripheral surface of the throttle intake-air passage (6) being opened to provide an inlet (18a) of the intake-air pressure introduction passage (18) upstream of the injector (8).

2. The multi-cylinder engine as set forth in claim 1, wherein when it is imagined that a transverse line (19) radially crosses the throttle intake-air passage (6) of a circular cross section and moves toward the inlet (18a) of the intake-air pressure introduction passage (18) and that a transverse extending line (19a) is extended from this transverse line (19) to an exterior area of the throttle intake-air passage (6) via the inlet (18a) of the intake-air pressure introduction passage (18), the intake-air pressure introduction passage (18), which is formed by drilling, is oriented so that it makes an angle of at least 45 degrees and not more than 75 degrees with respect to the imaginary transverse extending line (19a).

3. The multi-cylinder engine as set forth in claim 2, wherein on the projected drawing whose surface is perpendicular to a center axis (6a) of the throttle intake-air passage (6), the intake-air pressure introduction passage (18) is oriented so that it makes an angle (18α) of at least 45 degrees and not more than 75 degrees with respect to the imaginary transverse extending line (19a).

4. The multi-cylinder engine as set forth in claim 2, wherein a butterfly valve is used for the throttle valve (7), and on the projected drawing whose surface is in parallel to the center axis (6a) of the throttle intake-air passage (6) and the axis (12) of the throttle valve (7), this intake-air pressure introduction passage (18) has its inlet (18a) arranged so that the inlet (18a) overlaps the center axis (6a) of the throttle intake-air passage (6), the intake-air pressure introduction passage (18) being inclined downwardly from its outlet (18b) to its inlet (18a), when imaging that an extending axis (6c) is extended from the center axis (6a) of the throttle intake-air passage (6) to an exterior area of the throttle intake-air passage (6) through an inlet (6b) of the throttle intake-air passage (6), on the projected drawing whose surface is in parallel to the center axis (6a) and the axis (12) of the throttle valve (7), the intake-air pressure introduction passage (18) being oriented so that it makes an angle (18) of at least 45 degrees and not more than 75 degrees.

5. The multi-cylinder engine as set forth in claim 1, wherein the throttle body (5) is opened to provide a hole (20) for attaching the intake-air pressure sensor (15), the attaching hole (10) being communicated with the intake-air pressure introduction passage (18), and the attaching hole (20) is formed to face downwardly, the intake-air pressure sensor (15) being attached to the attaching hole (20), and is provided with a liquid fuel reservoir (21) therebelow, the liquid fuel reservoir (21) having an upper portion opened to provide the outlet (18b) of the intake-air pressure introduction passage (18).

6. The multi-cylinder engine as set forth in claim 1, wherein a direction of the center axis (6a) of the throttle intake-air passage (6) is taken as a front and rear direction and a downstream side of the axis (12) of the throttle valve (7) is deemed as the 'rear', and when seen in a direction parallel to the axis (12) of the throttle valve (7), a direction perpendicular to the front and rear direction is taken as a left and right lateral direction, the injector (8) being arranged behind the throttle input arm (22) and the attaching hole (20) for the intake-air pressure sensor (15) having a boss (20a) arranged laterally of the throttle input arm (22).

7. The multi-cylinder engine as set forth in claim 6, wherein the attaching hole (20) for the intake-air pressure sensor (15) makes its boss (20a) serve as a stopper for the pivotal movement of the throttle input arm (22).

8. The multi-cylinder engine as set forth in claim 1, wherein the throttle valve (7) of butterfly-type is disposed within the throttle intake-air passage (6) and is interlockingly connected to a mechanical governor (42), and an intake-air amount is adjusted based on a degree of opening of the throttle valve (7), and in order for the control means (17) to supply fuel of an amount in proportion to the intake-air amount to be metered, based on the intake-air pressure of the throttle intake-air passage (6) and the number of engine's rotations, from a fuel supply means (11) to the intake air, an inner peripheral surface of the throttle intake-air passage (6) has an annular inner peripheral surface of a predetermined width around the throttle valve (7) taken as a valve-surrounding inner peripheral surface (6d) and an annular inner peripheral surface adjacent this valve-surrounding inner peripheral surface (6d) is deemed as an adjacent inner peripheral surface (6e), the most distant portion from the axis (12) of the throttle valve (7) being taken as a pivotal end portion (7a), the adjacent inner peripheral surface (6e) being formed so that a passage defined by the surface (6e) has a sectional area progressively increasing as it goes further and further away from an end edge portion (6f) of the valve-surrounding inner peripheral surface (6d), when the engine is in operation at a low speed with a light load, the pivotal end portion (7a) of the throttle valve (7) existing at a slightly-open position (7c), which is close to a full-closed position (7b), being made to pivot within the adjacent inner peripheral surface (6e).

9. The multi-cylinder engine as set forth in claim 8, wherein
the adjacent inner peripheral surface (6e) is tapered as a truncated cone so that the sectional area of its passage is progressively increasing from the upstream end edge (6f) of the valve-surrounding inner peripheral surface (6d) toward an upstream side.

10. The multi-cylinder engine as set forth in claim 1, wherein
the annular peripheral surface of the predetermined width of the throttle intake-air passage (6) is formed as a venturi portion (6i), which is opened to provide the inlet (18a) of the intake-air pressure introduction passage (18).

11. The multi-cylinder engine as set forth in claim 1, wherein
a radial direction of the throttle intake-air passage (6) perpendicular to the axis (12) of the throttle valve (7) is taken as a left and right lateral direction, in order to arrange the inlet (18a) of the intake-air pressure introduction passage (18) in a lateral inner peripheral surface of the throttle intake-air passage (6),
when the throttle valve (7) is partitioned in the left and right direction with the valve axis (12) as a boundary at a full-closed position (7b) to form left and right lateral half portions, one of which is directed toward the downstream side of the valve axis (12) of the throttle valve (7) when the throttle valve (7) is open, to be deemed as a downstream-oriented half portion (7e),
while the throttle valve (7) is opening, the downstream-oriented half portion (7e) moves toward a lateral inner peripheral surface of the throttle intake-air passage (6), another lateral inner peripheral surface (6j) being opposite to this lateral inner peripheral surface, the intake-air pressure introduction passage (18) having its inlet (18a) arranged in that another lateral inner peripheral surface (6j).

12. The multi-cylinder engine as set forth in claim 1, wherein
the breather outlet (51) is arranged opposite to an interior area of a region extending from the throttle intake-air passage (6) to the distribution passage inlet portion (4) of the intake-air distribution passage (2).

13. The multi-cylinder engine as set forth in claim 12, wherein
a direction of the center axis (6a) of the throttle intake-air passage (6) is taken as a front and rear direction and an downstream side of the axis (12) of the throttle valve (7) is deemed as the 'rear', and
when seen in a direction parallel to the axis (12) of the throttle valve (7), the breather outlet (51) is arranged just behind the valve axis (12).

14. The multi-cylinder engine as set forth in claim 1, wherein
every cylinder (3) is provided with an ignition plug (36), an ignition circuit (37) of which is associated with a crank-shaft phase sensor (38) through the control means (17) and when the control means (17) performs an ignition timing control for throwing sparks from the ignition plug (36) at every predetermined timing of a combustion cycle of every cylinder (3), the ignition timing is made earlier for the cylinder (3) of a lower compression ratio.

15. The multi-cylinder engine as set forth in claim 14, wherein
the control means (17) performs the ignition timing control based on a mutually different ignition timing control map for every cylinder (3).

16. The multi-cylinder engine as set forth in claim 1, wherein
the fuel supply means (11) is arranged opposite to an interior area of a region extending from the throttle intake-air passage (6) to the distribution passage inlet portion (4) of the intake-air distribution passage (2) and is associated with a crank-shaft phase sensor (38) through the control means (17), and
when the control means (17) performs the fuel supply control for supplying the fuel to be fed to every cylinder (3), from the fuel supply means (11) to the intake air in the region at every predetermined timing of a combustion cycle for every cylinder (3), based on the detected phase of the crank shaft (39),
in the case of the same fuel supply amount, more fuel is supplied to the cylinder (3) where the fuel-air mixture has a lower fuel concentration.

17. The multi-cylinder engine as set forth in claim 16, wherein
the control means (17) performs the fuel supply control based on a mutually different fuel supply control map for every cylinder (3).

18. The multi-cylinder engine as set forth in claim 1, wherein
the fuel supply means (11) is arranged opposite to an interior area of a region extending from the throttle intake-air passage (6) to the distribution passage inlet portion (4) of the intake-air distribution passage (2) and is associated with a crank-shaft phase sensor (38) through the control means (17), and
when the control means (17) performs the fuel supply control for supplying the fuel to be fed to every cylinder (3), from a fuel supply means (11) to the intake air in the region at every predetermined timing of a combustion cycle for every cylinder (3), based on the detected phase of the crank shaft (39),
in the case of the same fuel supply start-timing, the fuel supply starts earlier for the cylinder (3) where the fuel-air mixture has a lower fuel concentration.

19. The multi-cylinder engine as set forth in claim 18, wherein
the control means (17) performs the fuel supply control based on a mutually different fuel supply control map for each of the cylinders (3).

20. The multi-cylinder engine as set forth in claim 1, wherein
the cylinder head (1) has a side surface to which a longitudinal box-shaped intake-air passage wall (2a) extending along a direction of arranging the plurality of cylinders (3) is attached, and a straight continuous intake-air distribution passage (2) is formed in the longitudinal direction within the box-shaped intake-air passage wall (2a), the respective cylinders (3) having their intake-air port inlets (3a) disposed opposite to an interior area of the intake-air distribution passage (2) while retaining a predetermined spacing in the longitudinal direction.

21. The multi-cylinder engine as set forth in claim 1, wherein
the throttle valve (7) has an upstream side opened to provide an upstream breather outlet (52), and when communicating the upstream breather outlet (52) with a breather chamber (56) through an upstream breather passage (52a),
the throttle valve (7) has a downstream side opened to provide a downstream breather outlet (53), which is communicated with the breather chamber (56) through an upstream breather passage (53a).

22. The multi-cylinder engine as set forth in claim 21, wherein
a common breather passage (54) is conducted out of the breather chamber (56), and the upstream breather passage (52a) and the downstream breather passage (53a) are branched from the common breather passage (54).

23. The multi-cylinder engine as set forth in claim 22, wherein
the upstream breather passage (52a) projecting from the common breather passage (54) has a starting end portion (52b) oriented upwards.

24. The multi-cylinder engine as set forth in claim 22, wherein
the downstream breather passage (53a) is oriented downwardly from the common breather passage (54) toward the downstream breather outlet (53).

25. The multi-cylinder engine as set forth in claim 21, wherein
the downstream breather passage (53a) is smaller than the upstream breather passage (52a) in sectional area.

26. The multi-cylinder engine as set forth in claim 21, wherein
the cylinder head (1) has an upper portion to which the head cover (25) is attached and this head cover (25) covers a rocker arm (55), when the breather chamber (56) is arranged at a ceiling portion of this head cover (25),
the breather chamber (56) having its inlet (56a) arranged at a positioned deviated from just above the rocker arm (55) and lower than a bottom wall (56b) of the breather chamber (56).

* * * * *